(12) United States Patent
Tsubaki et al.

(10) Patent No.: US 11,977,450 B2
(45) Date of Patent: May 7, 2024

(54) BACKUP SYSTEM, METHOD THEREFOR, AND PROGRAM

(71) Applicant: Nippon Telegraph and Telephone Corporation, Tokyo (JP)

(72) Inventors: Takuma Tsubaki, Tokyo (JP); Ryota Ishibashi, Tokyo (JP); Kotaro Ono, Tokyo (JP); Yuki Nakahara, Tokyo (JP); Takeshi Kuwahara, Tokyo (JP); Naoki Higo, Tokyo (JP); Kenta Kawakami, Tokyo (JP); Yusuke Urata, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 236 days.

(21) Appl. No.: 17/423,702

(22) PCT Filed: Aug. 7, 2019

(86) PCT No.: PCT/JP2019/031226
§ 371 (c)(1),
(2) Date: Jul. 16, 2021

(87) PCT Pub. No.: WO2020/158016
PCT Pub. Date: Aug. 6, 2020

(65) Prior Publication Data
US 2022/0083425 A1  Mar. 17, 2022

(30) Foreign Application Priority Data

Jan. 29, 2019 (JP) ................................ 2019-013050

(51) Int. Cl.
*G06F 16/18* (2019.01)
*G06F 11/14* (2006.01)
(52) U.S. Cl.
CPC ............................. *G06F 11/1448* (2013.01)

(58) Field of Classification Search
CPC ............. G06F 16/1844; G06F 11/1461; G06F 11/1469; H04L 67/1095; H04L 69/40
See application file for complete search history.

(56) References Cited

U.S. PATENT DOCUMENTS

| 2008/0313242 A1* | 12/2008 | Doerr | ................. G06F 11/2035 |
| 2017/0116091 A1* | 4/2017 | Anderson | ........... H04L 41/0668 |
| 2018/0095855 A1* | 4/2018 | Sanakkayala | ....... G06F 11/1438 |

FOREIGN PATENT DOCUMENTS

| JP | 2008112358 | 5/2008 |
| JP | 2014017462 | 1/2014 |

(Continued)

OTHER PUBLICATIONS

Alshammari et al., "Disaster recovery in single-cloud and multi-cloud environments: issues and challenges," 2017 IEEE International Conference on Engineering Technologies and Applied Sciences (ICETAS), Nov. 29, 2017, 7 pages.

(Continued)

*Primary Examiner* — Apu M Mofiz
*Assistant Examiner* — Cindy Nguyen
(74) *Attorney, Agent, or Firm* — Fish & Richardson P.C.

(57) ABSTRACT

Backup system and method that can determine a backup destination in consideration of disaster are provided. There are provided: a data acquisition unit 110 that acquires disaster information, network information, and node information; a replication group construction unit 130 that generates, based on the disaster information, and the like, replication group information including association information between a first node that stores original data and one or more second nodes that are candidates for backup destination of the original data, and saves the replication group information in a storage unit 120; a replication destination node calculation unit 140 that, when executing backup of the original data, calculates the second node as backup destina- (Continued)

tion from the replication group; and a replication processing unit 230 that replicates and stores the original data into the storage of the second node.

12 Claims, 24 Drawing Sheets

(56) References Cited

FOREIGN PATENT DOCUMENTS

| | | |
|---|---|---|
| JP | 2014046771 | 3/2014 |
| JP | 2017010237 | 1/2017 |

OTHER PUBLICATIONS

Ferdousi et al., "Disaster-aware data-center and content placement in cloud networks," 2013 IEEE International Conference on Advanced Networks and Telecommunications Systems (ANTS), Dec. 15, 2013, 3 pages.

Li et al., "Redundancy-Guaranteed and Receiving-Constrained Disaster Backup in Cloud Data Center Network," IEEE Access, Sep. 21, 2018, 6:47666-47681.

Qasmi et al., "A Comparative Study of Failover Schemes for IaaS Recovery," 2018 IEEE International Conference on Information Networking (ICOIN), Jan. 10, 2018, pp. 25-30.

* cited by examiner

EXAMPLE OF REPLICATION TO NODE HAVING
LARGE REMAINING STORAGE CAPACITY
WHEN RG: (A, C, E)

BACKUP SYSTEM, METHOD THEREFOR, AND PROGRAM

CROSS-REFERENCE TO RELATED APPLICATIONS

This application is a National Stage application under 35 U.S.C. § 371 of International Application No. PCT/JP2019/031226, having an International Filing Date of Aug. 7, 2019, which claims priority to Japanese Application Serial No. 2019-013050, filed on Jan. 29, 2019. The disclosure of the prior application is considered part of the disclosure of this application, and is incorporated in its entirety into this application.

TECHNICAL FIELD

The present invention relates to a backup system that store data stored in storage deployed at a node in a network into another storage deployed at another nodes.

BACKGROUND ART

In recent years, as video Internet of Things (IoT) becomes widespread, security cameras have been disposed for various purposes such as crime prevention in stores and ecological records of animals, and created video files (hereinafter referred to as simply "files") are stored in storage placed at a location (node) via a network for a long period, enabling viewing, analysis, and the like of the videos at remote locations.

Here, in order to prevent file loss due to storage failures or the like, files are replicated in another storage at the same location or another storage at another location. Especially, in the case that disaster avoidance is assumed, files are replicated at multiple locations (e.g., multiple data centers), thereby preventing file loss due to disaster. It is believed that such file loss caused by disaster can be prevented by replicating files at data centers separated from each other by 500 km or more (for example, Tokyo and Osaka) in the domestic case, and at data centers in different countries in the foreign case.

CITATION LIST

Non Patent Literature

Non Patent Literature 1: Qasmi, Wasiq Noor Ahmad, et al. "A comparative study of failover schemes for IaaS recovery." Information Networking (ICOIN), 2018 International Conference on. IEEE, 2018
Non Patent Literature 2: Li, Xiaole, et al. "Redundancy-Guaranteed and Receiving-Constrained Disaster Backup in Cloud Data Center Network." IEEE Access 6 (2018): 4766647681
Non Patent Literature 3: Ferdousi, Sifat, et al. "Disaster-aware data-center and content placement in cloud networks." 2013 IEEE International Conference on Advanced Networks and Telecommunications Systems (ANTS). IEEE, 2013.
Non Patent Literature 4: Alshammari. Mohammad M., et al. "Disaster recovery in single-cloud and multi-cloud environments: Issues and challenges." 2017 4th IEEE International Conference on Engineering Technologies and Applied Sciences (ICETAS). IEEE, 2017.

SUMMARY OF THE INVENTION

Technical Problem

However, because resources (storage) that store files by replication, that is, a lot of locations that are replication destinations are distributed in a wide area, it is difficult to select the physical replication destination according to the assumed disaster. Further, even if the physical replication destination is determined, replication may not be possible due to the fact that the remaining resources in the replication destination are low when actually attempting replication.

On the other hand, there are existing techniques for access to backup sites (Non Patent Literature 1) and backup method (Non Patent Literature 2). However, Non Patent Literature 1 describes how failover method of application accesses a predetermined backup site, but does not describe any technique of specifying the physical distribution destination. In addition. Non Patent Literature 2 describes how the transmission order and throughput are set in consideration of the bandwidth usage condition, but does not describe contents physically disposed.

Thus, no technique of determining the physical replication destination has been established yet.

In light of the foregoing, an object of the present invention is to provide a backup system and method that can determine a backup destination in consideration of disaster.

Means for Solving the Problem

To achieve the above object, the present invention provides a backup system, in a network including a plurality of nodes, each of the plurality of nodes to which storage is deployed, for replicating and storing original data stored in storage of a first node of the plurality of nodes into storage of at least one second node of the plurality of nodes, the backup system including an information acquisition unit configured to acquire disaster information, network information, and node information, a backup destination node information generation unit configured to, based on the disaster information, the network information, and the node information, generate backup destination node information including association information between the first node that stores the original data and one or more second nodes of the at least one second node that are candidates for backup destination of the original data, and save the backup destination node information in a predetermined storage unit, a backup destination node calculation unit configured to, when executing backup of the original data, calculate a second node of the at least one second node as the backup destination from the one or more second nodes that are the candidates for the backup destination included in the backup destination node information, and a backup execution unit configured to replicate and store the original data from the storage of the first node into the storage of the second node that is calculated.

Effects of the Invention

According to the present invention, because the node of the backup destination is determined in consideration of the disaster information, a suitable backup system that is resistant to disaster can be constructed. In addition, according to the present invention, the backup destination node information including the association information between the first node that stores the original data and the one or more second nodes that are candidates for backup destination of the original data is generated in advance. Then, when executing backup of the original data, the second node is calculated as the backup destination from among the one or more second nodes that are candidates for the backup destination included in the backup destination node information. As a result, the backup destination calculation processing need not take into account all of the nodes, reducing the load of the calculation processing.

DESCRIPTION OF EMBODIMENTS

Figure 1:
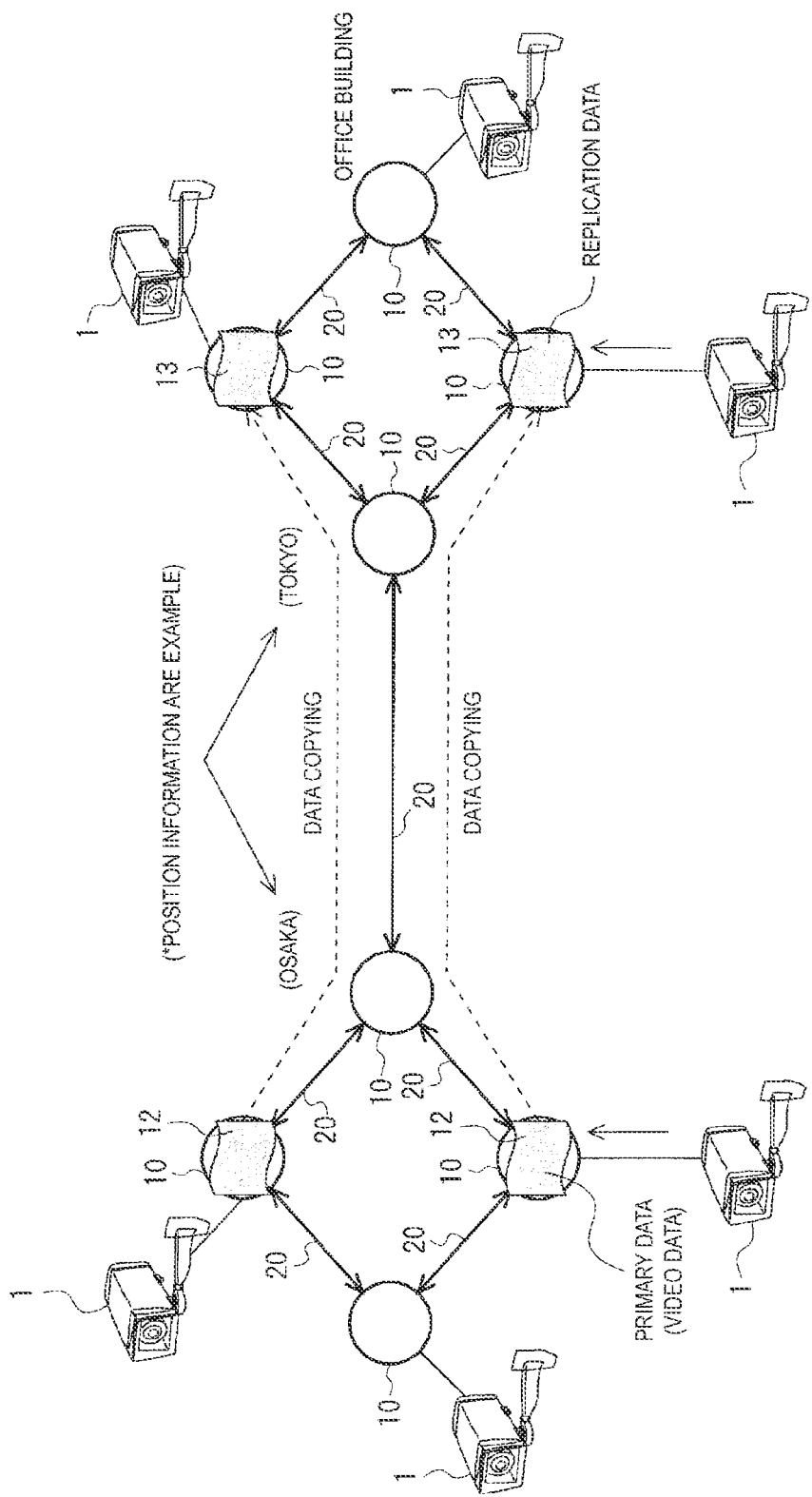
FIG. 1 is a diagram illustrating a network configuration assumed in the present invention.

First, a network configuration assumed in the present invention will be described with reference to FIG. 1. FIG. 1 is a diagram illustrating the network configuration assumed in the present invention.

As illustrated in FIG. 1, the network is configured such that a plurality of nodes 10 each are connected to other nodes 10 via respective links 20. Storage (not illustrated) that stores files is deployed at each node 10. Each node 10 corresponds to a geographically isolated location. Examples of the node 10 include a data center and a base station. The link 20 is a line connecting the nodes 10 to each other. Note that the network topology is not limited to that illustrated in FIG. 1, and may be any of a mesh structure, a hierarchical structure, a tree structure, a combination thereof, and the like. The network may be constituted of a single carrier network, may be constituted of a plurality of carrier networks, or may include the Internet.

The node 10 is connected to a terminal 1, such as a video IoT terminal, which generates data and stores the data in the storage of the node 10. In other words, at the application level, the node 10 accommodates the terminal 1. The type, form, and the like of the terminal 1 are not specifically limited. Note that, in the present application, data that is generated by the terminal 1 connected to the node 10 and stored in the storage of the node 10 connected to the terminal 1 (in other words, original data to be backed up) is referred to as primary data 12. Data that is replicated from the primary data 12 and stored in storage of another node 10 is referred to replication data 13.

The backup system according to the present embodiment previously construct a group indicating candidates for the node 10 that is a backup destination for the primary data 12. Then, at execution of backup, the backup system according to the present embodiment calculates the node 10 that is the backup destination from the group, and backs up the primary data 12 into the storage of the calculated node 10.

Note that the "backup" according to the present embodiment may be replication that is real-time backup of data stored in the node 10, or backup of data stored in the node 10 on a regular basis or at any time, such as a regular backup. A replication system according to an embodiment of the present invention will be described below with reference to drawings.

Figure 2:
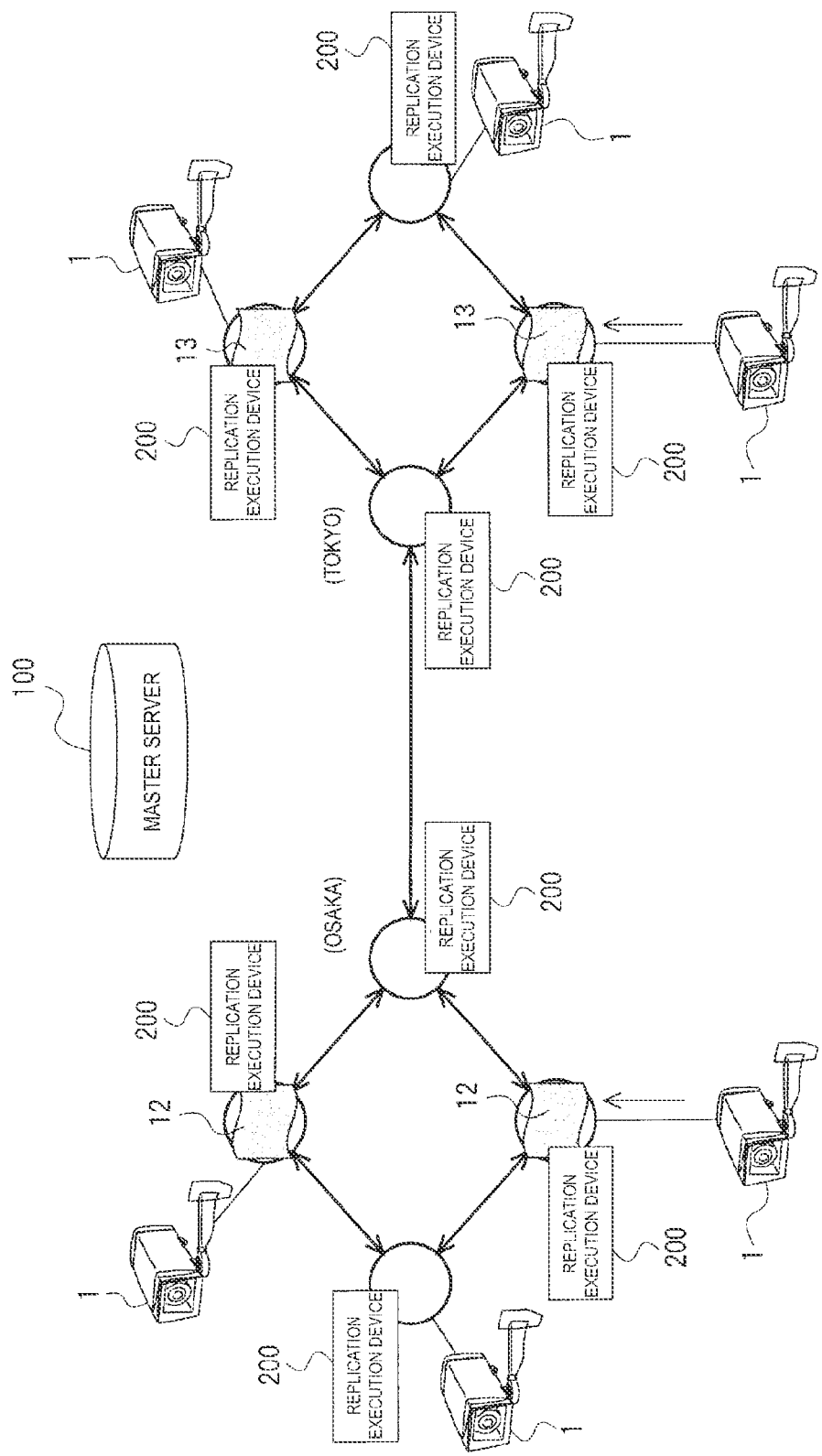
FIG. 2 is a diagram illustrating a configuration of a replication system according to an embodiment of the present invention.

FIG. 2 is a diagram illustrating the configuration of a replication system according to the present embodiment. As illustrated in FIG. 2, the replication system includes a master server 100 that controls replication, and a replication execution device 200 deployed at each node 10. The master server 100 may be deployed anywhere within the network as long as it is capable of communicating with each node 10. The implementations of the master server 100 and the replication execution device 200 are not specifically limited, and may be implemented as dedicated devices, may be implemented by installing a program on a general-purpose device or a virtualization environment thereof, or may be implemented in a distributed manner.

Figure 3:
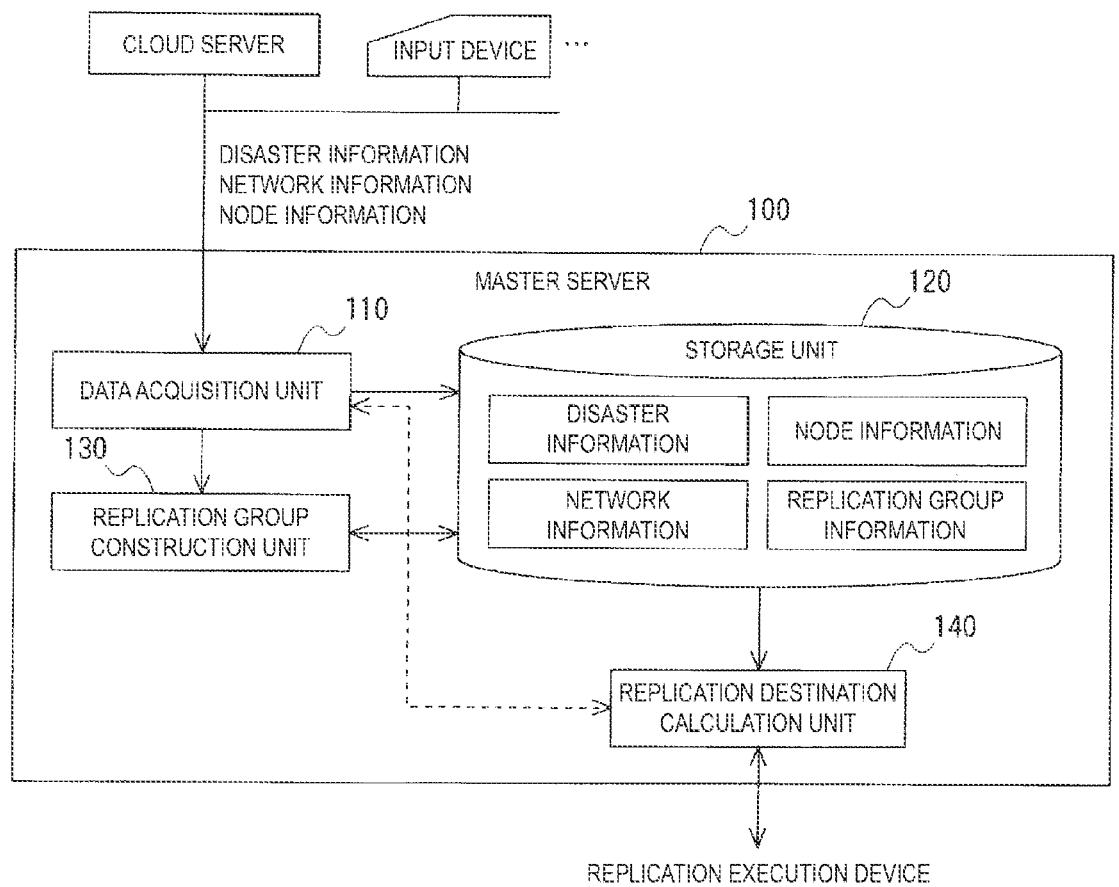
FIG. 3 is a functional block diagram of a master server according to the embodiment of the present invention.

FIG. 3 is a functional block diagram of the master server. As illustrated in FIG. 3, the master server 100 includes a data acquisition unit 110, a storage unit 120, a replication group construction unit 130 (backup destination node information generation unit), and a replication destination calculation unit 140 (backup destination node calculation unit). Here, the data acquisition unit 110 acquires various data such as disaster information, network information, node information. The storage unit 120 stores and holds the acquired data, and stores and holds replication group information described below. The replication group construction unit 130 constructs a replication group described below.

Figure 4:
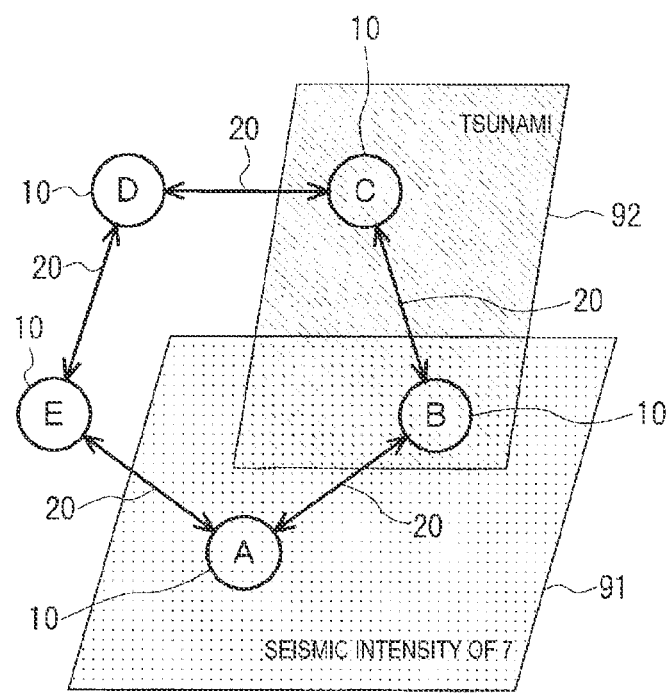
FIG. 4 is a diagram illustrating an example of disaster information.

The data acquisition unit 110 acquires the disaster information from a predetermined cloud server or by an input of the administrator, and stores the disaster information in the storage unit 120. Here, the disaster information (static disaster information) refers to information about an area (disaster area) where damage is expected to occur due to disaster such as earthquake, and includes area information (the extent of disaster), strength information (e.g., seismic intensity of 7, 6 upper for the earthquake, and height for the tsunami). Examples of the disaster of interest include not only disaster such as a particular earthquake (Nankai Trough giant earthquake, large earthquake occurring directly under the capital, etc.), but also hazards associated with the above-mentioned disaster (e.g., tsunami associated with earthquake). Further, the disaster information is not limited to the seismic intensity data and the tsunami data, and may be data about anything that damages buildings that accommodate the storage and the like. Note that as illustrated in FIG. 4, the disaster area of certain disaster does not always match the disaster area of hazard associated with the disaster. In the example in FIG. 4, an area 91 related to earthquake with a seismic intensity of 7 contains the nodes 10 having node IDs "A" and "B", and an area 92 related to tsunami associated with the earthquake 7 contains the nodes 10 having nodes IDs "B" and "C". Because government and private enterprises provide the disaster information via the network, the data acquisition unit 110 can acquire the disaster information via the network.

The data acquisition unit 110 acquires network information from a network device that constitutes the network or a management device that manages the network via the network, or an input of the administrator, and stores the acquired network information in the storage unit 120. Here, the network information is information indicating the network configuration illustrated in FIGS. 1 and 2, and includes static information such as geographic location information about each node 10, network connectivity status (network topology) between the nodes 10, the band and link cost of each link 20, and the number of hops between the nodes 10. In some examples, the network information may include dynamically changing information such as the band usage rate of each link 20. Note that the number of hops can be calculated from the network topology, and thus may not be stored in the storage unit 120.

In addition, the data acquisition unit 110 acquires node information from a management device deployed at each node 10 or a management device that centrally manages the nodes 10 via the network, or from an input of the administrator, and stores the acquired node information in the storage unit 120. Here, the node information includes identification information about the node 10, and the various information about the storage of the node 10. The various information about the storage includes static information such as the storage capacity of the entire node 10 at which the storage is deployed, and the writing speed of the storage. In some examples, the storage information may include dynamically changing information such as the remaining storage capacity.

When static information among the various information stored in the storage unit 120 is updated, the replication group construction unit 130 creates a replication group based on the various information stored in the storage unit 120, and stores information about the created replication group in the storage unit 120.

Figure 5:
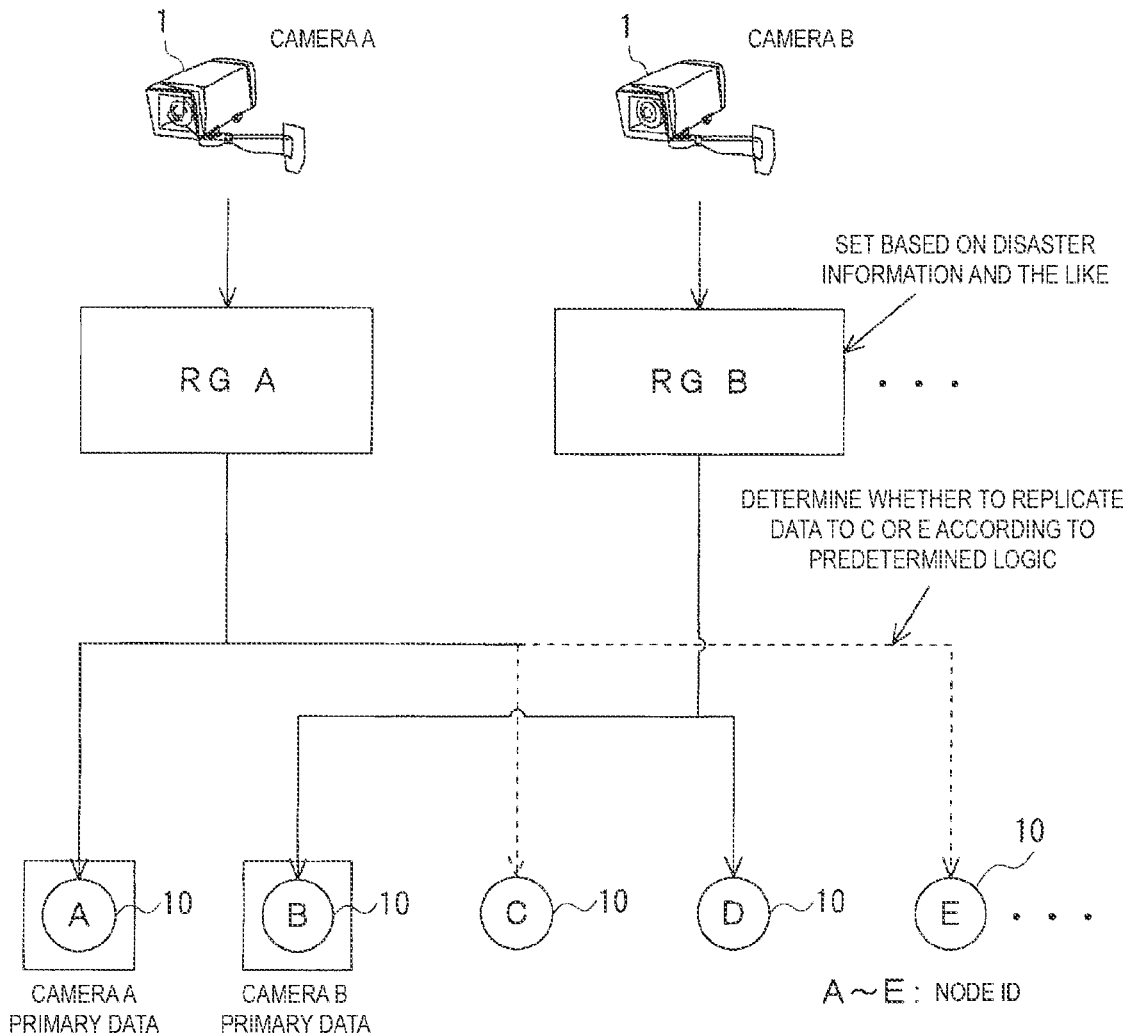
FIG. 5 is a diagram illustrating a replication group.

The replication group will be described with reference to FIG. 5. The replication group refers to information associating (correlating) the node 10 that saves the primary data 12 with one or more nodes 10 that are candidates of the replication destination for the primary data 12. In the present embodiment, as illustrated in FIG. 5, the replication group information consists of an ordered set including identification information about the plurality of nodes 10. A first element of the replication group information represents the identification information about the node 10 that saves the primary data 12. In addition, one or more elements following the first element of the replication group information represent the identification information about the nodes 10 that are candidates for the replication destination. The number of nodes n_p in the group may be previously stored in the storage unit 120 or may be dynamically calculated based on service level agreement (SLA) and the like. Note that, in the drawings of the present application, the replication group is abbreviated as "RG" as necessary.

Figure 6:
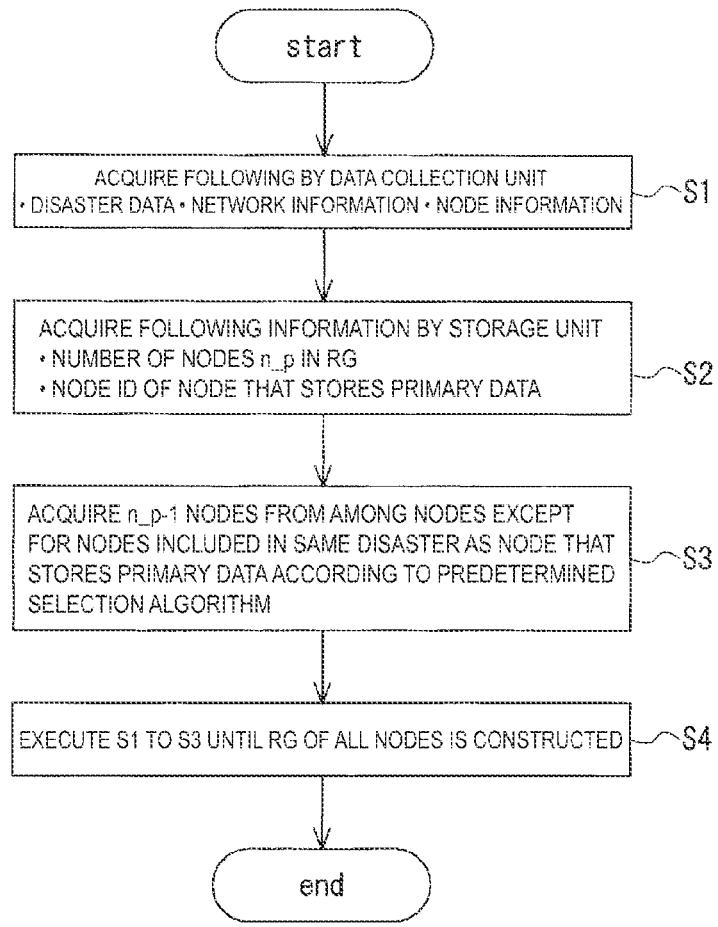
FIG. 6 is a flowchart illustrating replication group construction processing.

Replication group construction processing will be described with reference to FIG. 6. FIG. 6 is a flowchart illustrating the replication group construction processing. The construction processing is executed at update of the disaster information collected by the data acquisition unit 110, update of static information among the network information, and update of static information among the node information.

First, the data acquisition unit 110 acquires the disaster information, the network information, and the node information (Step S1). Next, the replication group construction unit 130 acquires, from the storage unit 120, the number of nodes n_p in replication, and the node ID of the node 10 that stores the primary data 12 (Step S2). Next, the replication group construction unit 130 excludes, from all nodes 10, other nodes 10 included in the same disaster as the disaster area in which the node 10 is included. Further, the replication group construction unit 130 selects n_p−1 nodes 10 from the remaining nodes 10 as a candidate for replication destination according to a predetermined selection algorithm. Through these processing operations, the replication group construction unit 130 extracts the candidate for replication destination of the node 10 from all nodes 10 (Step S3). The above processing is executed on all of the nodes 10 that store the primary data 12 (Step S4). The replication group construction unit 130 stores the generated replication group information in the storage unit 120.

In the selection processing in Step S3, the replication group construction unit 130 refers to the node information stored in the storage unit 120 to select n_p−1 nodes 10 as the candidate for replication destination from the remaining nodes 10 according to the predetermined selection algorithm.

Examples of the selection algorithms include (a) randomly selecting the node, (b) selecting the node having a smallest network distance (number of hops) from the node that stores the primary data 12, (c) selecting the node having a largest storage capacity, and the like. Note that in the selection processing (b) and (c), when the number of nodes cannot be narrowed down to n_p, the node 10 with a smallest number of disasters in which each node 10 is included may be further selected, or the node 10 may be randomly selected.

Figure 7:
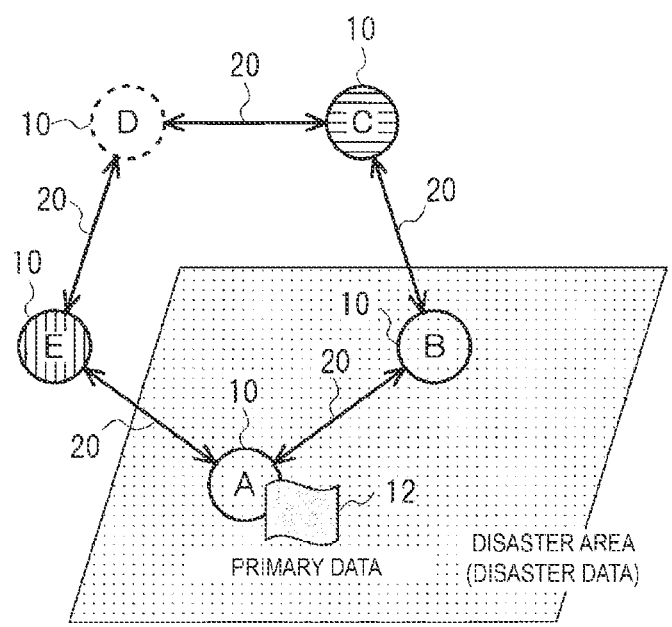
FIG. 7 is a diagram illustrating an example of replication group construction.

The above (a) has the advantage of the simplest implementation. The above (b) has the advantage of reducing the consumption of network resources and processing time during replication. Further, the above (c) has the advantage of reducing the frequency of running out of the storage capacity of the entire replication group. FIG. 7 illustrates an example of replication group construction for the node 10 having the node ID "A". In the example in FIG. 7, the above (b) is used as the selection algorithm.

Figure 8:
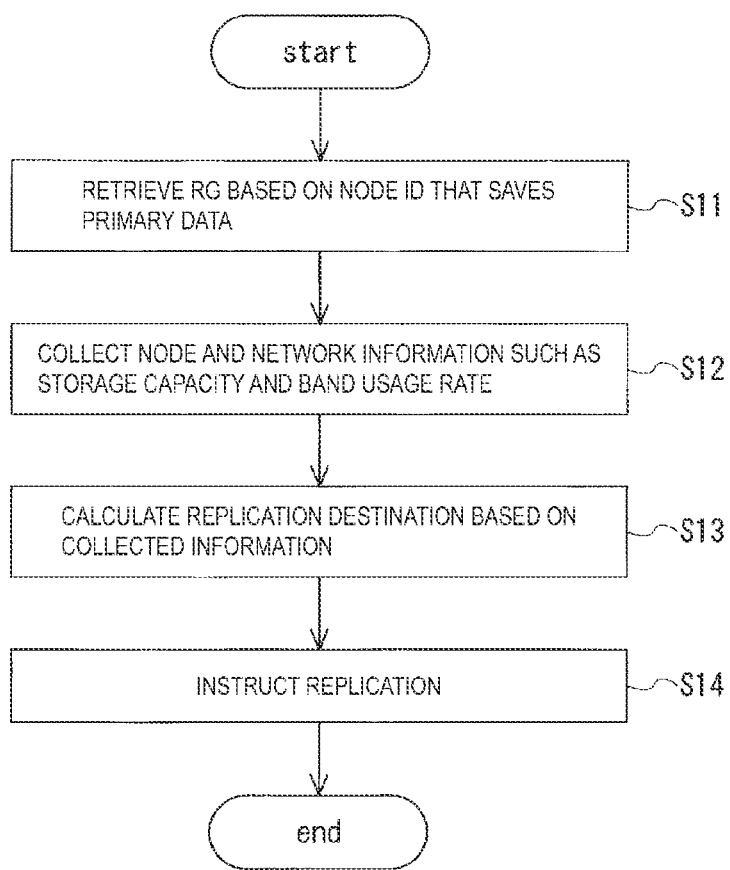
FIG. 8 is a flowchart illustrating processing of a replication destination calculation unit.

The function of the replication destination calculation unit 140 will be described with reference to FIG. 8. FIG. 8 is a flowchart illustrating replication destination calculation processing.

The replication destination calculation unit 140 starts replication destination calculation processing based on a data detection notification received from the replication execution device 200 of the node 10. The replication destination calculation unit 140 first acquires, from the storage unit 120, the replication group for the node 10 that is the source of the data detection notification (Step S11). Next, the replication destination calculation unit 140 acquires the network information and node information required for the calculation from the storage unit 120 (Step S12). In some examples, the replication destination calculation unit 140 acquires static information as well as dynamic information according to a calculation algorithm described below. When the dynamic information is stored in the storage unit 120, the replication destination calculation unit 140 may acquire the dynamic information. In addition, the replication destination calculation unit 140 may acquire dynamic information in real-time from the data acquisition unit 110.

Next, the replication destination calculation unit 140 calculates a following node 10 based on the various information acquired in Steps S11 and S12 using a predetermined calculation algorithm (Step S13). The following node 10 is another node 10 that is a replication destination for the primary data 12 stored in the storage of the node 10 that is the source of the data detection notification. The replication destination calculation unit 140 transmits the node ID of the calculated node 10 that is the replication destination to the replication execution device 200 (Step S14).

The calculation processing of the replication destination calculation unit 140 will be described. When the number of nodes n_p is 2, the replication destination is uniquely determined. When the number of nodes n_p is larger than 2, that is, when a plurality of nodes 10 that are candidates for replication destination are present in the replication group, the node 10 is calculated according to the above-mentioned calculation algorithm.

In the calculation algorithm, as an entire system, based on an index value of storage usage efficiency or cost, or an index value of throughput at replication, the node 10 that is the replication destination is calculated so as to optimize the index value. For example, (a) a calculation algorithm in which the replication destination calculation unit 140 determines the replication destination based on the remaining storage capacity can be mentioned. Alternatively, (b) a calculation algorithm in which the replication destination calculation unit 140 determines the replication destination based on the available bandwidth of the band can be mentioned. Alternatively. (c) a calculation algorithm in which the replication destination calculation unit 140 determines the replication destination based on the writing speed of the disk (low-cost disk) can be mentioned. Alternatively, (d) a calculation algorithm in which the replication destination calculation unit 140 determines the replication destination based on the number of hops from the node 10 that stores the primary data 12 can be mentioned.

The above (a) has the advantage that it is possible to reduce the frequency that the storage capacity becomes insufficient. The above (b) has the advantage that it is possible to minimize the shortage of the band of the link 20. The above (c) has the advantage that low-cost replication is possible. The above (d) has the advantage of improving the usage efficiency of resources of the network and reducing round trip time (RTT).

Note that the selection algorithm of the replication group construction unit 130 and the calculation algorithm of the replication destination calculation unit 140 are independent, and may be combined in any manner.

Figure 9:
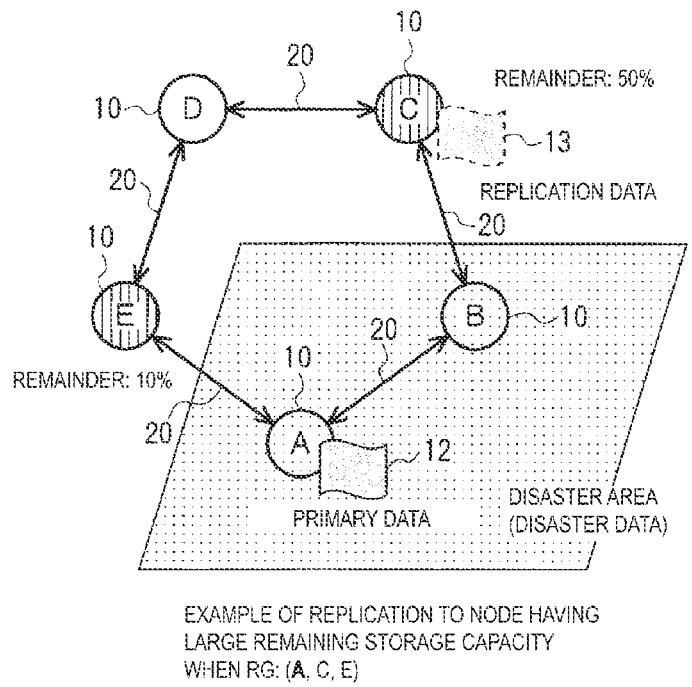
FIG. 9 is a diagram illustrating an example of calculation of the replication destination.

FIG. 9 illustrates an example of replication to the node having a large remaining storage capacity when the replication group consists of (A, C, E). Here, the node C and the node E have the same total storage capacity, and the remaining storage capacity is expressed in %.

Figure 10:
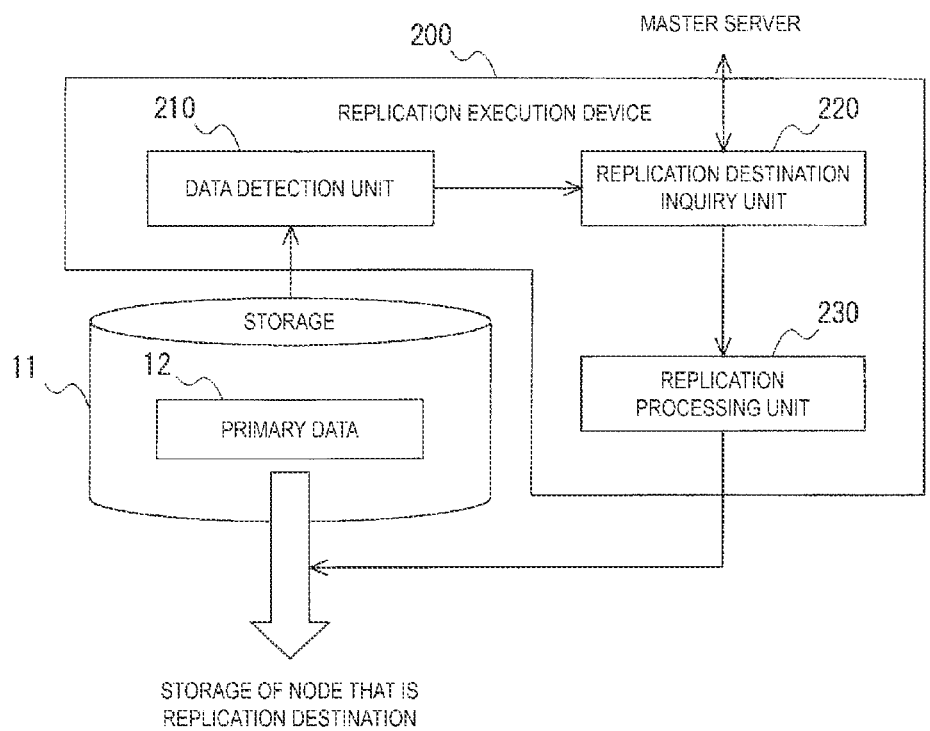
FIG. 10 is a functional block diagram of a replication execution device.

FIG. 10 is a functional block diagram of the replication execution device. As illustrated in FIG. 10, the replication execution device 200 includes a data detection unit 210, a replication destination inquiry unit 220, and a replication processing unit 230. The data detection unit 210 monitors the storage 11 of the node 10, and detects that the primary data 12 has been saved by the terminal 1. When the data detection unit 210 detects the saving of the primary data 12, the replication destination inquiry unit 220 inquires the replication destination calculation unit 140 of the master server 100 about the node 10 that is the replication destination. When receiving a response from the replication destination calculation unit 140, the replication destination inquiry unit 220 specifies the node 10 that is the replication destination and instructs the replication processing unit 230 to execute replication. The replication processing unit 230 replicates the primary data 12 to the specified node 10.

Example 1

Example 1 of the present invention will be described below with reference to FIG. 11. Example 1 is an example of the construction of the replication group by the replication group construction unit 130. In Example 1, the selection algorithm of the replication group construction unit 130 is a selection algorithm that performs selection based on the number of hops. In addition, as a result of the selection based on the number of hops, when a plurality of candidate nodes are present, the replication group construction unit 130 further selects a node based on the number of pieces of disaster information to which the node belongs (preferably selects a node that is not included in the disaster information). Note that the number of nodes n_p in the replication group is 3.

In the following description, the node 10 having the node ID "X" is denoted as node X.

The replication group construction unit 130 first constructs a replication group in the case where the primary data 12 is saved at a node A. Here, because the node A is included in an area of seismic intensity of 7, a node C, a node D, and a node E that are not included in the area of seismic intensity of 7 are targets for the replication group. Next, the replication group construction unit 130 selects top two nodes in increasing order of the number of hops (because the replication group includes own node, i.e., the node A). In the example in FIG. 11, the node E has the number of hops of 1, and the node C and the node D have the number of hops of 2. Thus, the replication group construction unit 130 selects the node D, which is not included in the disaster information, that is, has a small number of pieces of disaster information to which the node belongs, from the node C and the node D that have the number of hops of 2. As a result, the replication group in the case where the primary data 12 is saved at the node A is (A, D, E) as illustrated in FIG. 11.

Figure 11:
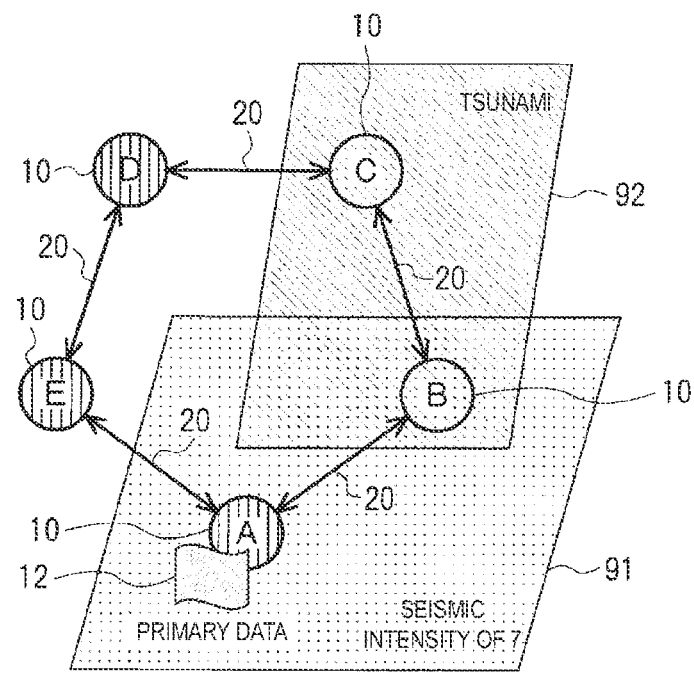
FIG. 11 is a diagram illustrating Example 1 of the present invention (replication group construction example 1).

By performing similar calculation for the node B to the node E, the replication group in the case where the primary data 12 is included in each of the nodes is constructed, as illustrated in FIG. 11.

Example 2

Example 2 of the present invention will be described below with reference to FIG. 12. Example 2 is an example of the construction of the replication group by the replication group construction unit 130. In Example 2, the selection algorithm of the replication group construction unit 130 is a selection algorithm that selects nodes having a large storage capacity. Note that the number of nodes n_p in the replication group is 3.

The replication group construction unit 130 first constructs a replication group in the case where the primary data 12 is saved at a node A. Here, because the node A is included in an area of seismic intensity of 7, a node C, a node D, and a node E that are not included in the area of seismic intensity of 7 are targets for the replication group. Next, the replication group construction unit 130 selects top two nodes in descending order of storage capacity (because the replication group includes own node, i.e., the node A). In the example in FIG. 12, the node D and the node E are selected. As a result, the replication group in the case where the primary data 12 is saved at the node A is (A, D, E) as illustrated in FIG. 12.

Figure 12:
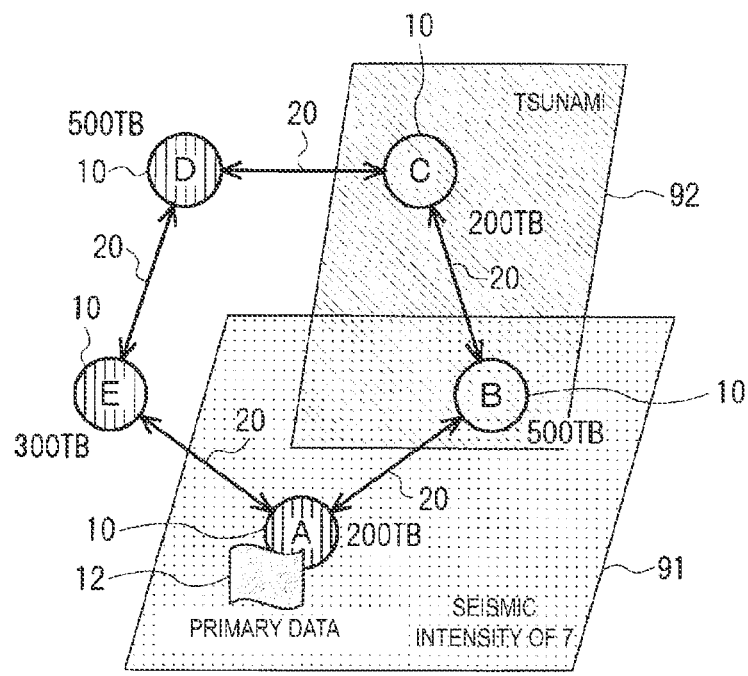
FIG. 12 is a diagram illustrating Example 2 of the present invention (replication group construction example 2).

By performing similar calculation for the node B to the node E, the replication group in the case where the primary data 12 is included in each of the nodes is constructed, as illustrated in FIG. 12.

Example 3

Example 3 of the present invention will be described below with reference to FIG. 13. Example 3 is an example of calculation of the replication destination by the replication destination calculation unit 140. In Example 3, the calculation algorithm of the replication destination calculation unit 140 is a calculation algorithm that determines the replication destination based on the remaining storage capacity. Note that in Example 3, the replication group is constructed in advance in accordance with Example 1 described above.

In Example 3, the data detection unit 210 detects that the primary data 12 is saved at the node A. and the replication destination calculation unit 140 calculates the replication destination. In addition, in Example 3, it is assumed that the replication group illustrated in FIG. 13 is constructed in advance.

Figure 13:
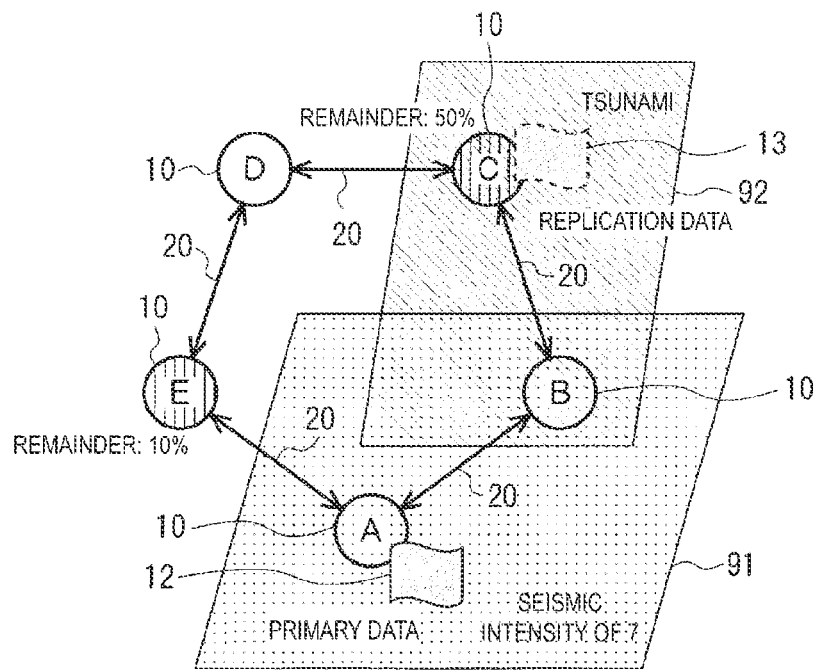
FIG. 13 is a diagram illustrating Example 3 of the present invention (replication destination node calculation example 1).

As illustrated in FIG. 13, because the node A is included in the replication group (A, C. E), two nodes C, E are selected as candidates for the replication destination. Because "the replication destination is determined based on the remaining storage capacity" in Example 3, the replication destination calculation unit 140 acquires the remaining storage capacity of each node from the storage unit 120 or the data acquisition unit 110. Here, it is assumed that remaining storage capacities of the node C and the node E are 50%, 10%, respectively. Thus, the replication destination calculation unit 140 calculates the node C having a larger remaining storage capacity as the replication destination. It is assumed that the node C and the node E have the same total storage capacity.

Example 4

Example 4 of the present invention will be described below with reference to FIG. 14. Example 4 is an example of calculation of the replication destination by the replication destination calculation unit 140. In Example 4, the calculation algorithm of the replication destination calculation unit 140 is a calculation algorithm that determines the replication destination based on the available bandwidth of the band. Note that in Example 4, the replication group is constructed in advance in accordance with Example 1 described above.

In Example 4, the data detection unit 210 detects that the primary data 12 is saved at the node A, and the replication destination calculation unit 140 calculates the replication destination. In addition, in Example 4, it is assumed that the replication group illustrated in FIG. 14 is constructed in advance.

Figure 14:
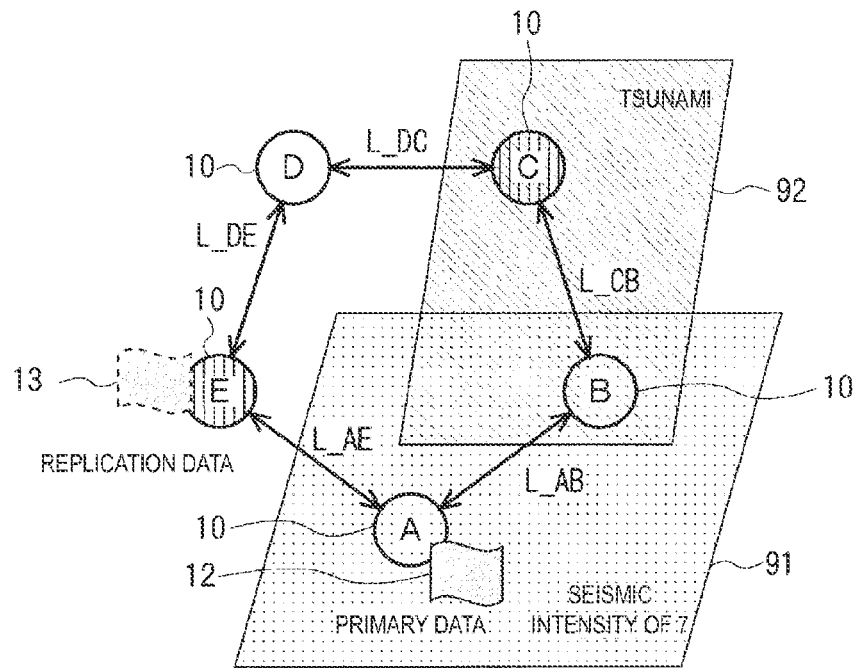
FIG. 14 is a diagram illustrating Example 4 of the present invention (replication destination node calculation example 2).

As illustrated in FIG. 14, because the node A is included in the replication group (A, C, E), two nodes C, E are selected as candidates for the replication destination. Because "the replication destination is determined based on the available bandwidth of the band" in Example 4, the replication destination calculation unit 140 acquires the available capacity of the link between nodes from the storage unit 120 or the data acquisition unit 110. Here, the link between nodes i and j is designated as L_ij. It is assumed that the available capacity of the band of each link is as illustrated in FIG. 14.

To prevent shortage of the band in the link, the replication destination calculation unit 140 selects the node (C or E) having a largest minimum value of available bandwidth between the nodes (the node A and the node C, the node A and the node E) as the replication destination. In the example in FIG. 14, since there are respective 10 and 3 available bandwidths between the node A and the node C, the number is 3, and since there is 7 available bandwidth between the node A and the node E, the number is 7. That is, since the minimum value of the available bandwidth between the node A and the node E is larger, the replication destination calculation unit 140 calculates the node E as the replication destination.

Example 5

Example 5 of the present invention will be described below with reference to FIG. 15. Example 5 is an example of calculation of the replication destination by the replication destination calculation unit 140. In Example 5, the calculation algorithm of the replication destination calculation unit 140 is a calculation algorithm that determines the replication destination based on the writing speed of the disk (low-cost disk). Note that in Example 5, the replication group is constructed in advance in accordance with Example 1 described above.

In this example 5, the data detection unit 210 detects that the primary data 12 is saved at the node A. and the replication destination calculation unit 140 calculates the replication destination. In addition, in Example 5, it is assumed that the replication group illustrated in FIG. 15 is constructed in advance.

Figure 15:
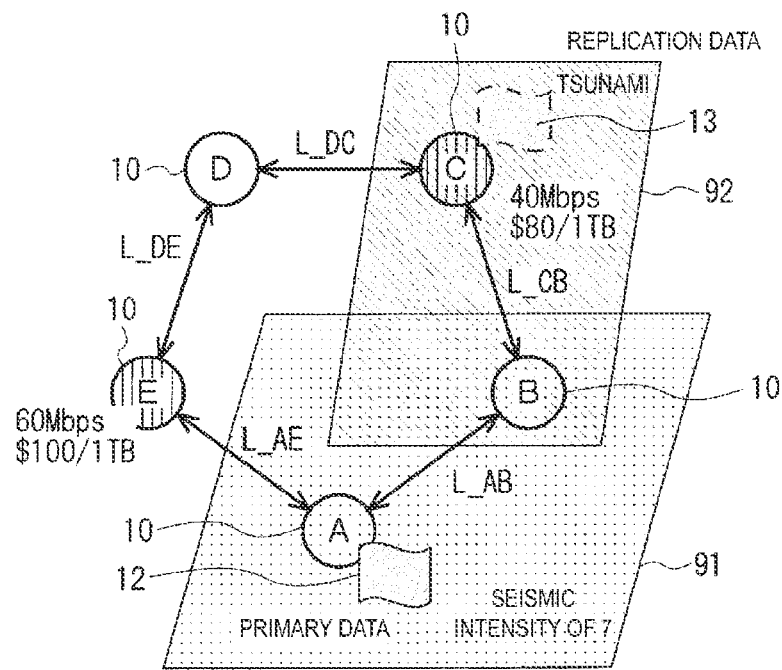
FIG. 15 is a diagram illustrating Example 5 of the present invention (replication destination node calculation example 3).

As illustrated in FIG. 15, because the node A is included in the replication group (A, C, E), two nodes C, E are selected as candidates for the replication destination. Because "the replication destination is determined based on the writing speed of the disk (low-cost disk)" in Example 5, the replication destination calculation unit 140 acquires the writing speed (or cost) of the disk at each node from the storage unit 120 or data acquisition unit 110.

As illustrated in FIG. 15, when the writing speed (cost) of the disk at the node C and the node E are 40 Mbps ($80/1 TB), 60 Mbps ($100/1 TB), respectively, the replication destination calculation unit 140 calculates the low-cost node C as the replication destination.

While one embodiment of the present invention has been described in detail, the present invention is not limited to the embodiment. For example, although the above embodiment describes the replication system that backs up data stored in the node 10 in real-time, the present invention can also be applied to a system that backs up data stored in the node 10 on a regular basis or at any time, such as regular backup.

Further, although the above embodiment describes the IoT terminal such as the terminal 1 that outputs video, but the present invention can be applied to other types of terminals.

Further, although the above embodiment describes data (file) as the target for backup, the virtualization environment such as a virtual machine (VM), a container, or the like other than the data may be a target for backup. The VM is a virtual server divided from a physical server. The container is a virtual user space provided on one OS.

Other embodiments of the present invention will be described below.

Other Embodiments

In an edge computing (EC) environment, it is necessary to prevent a reduction in the availability of virtual machines (VM) or containers, data (file) loss, and the like due to a failure of the server or storage. For this reason, backup (including replication) to another server or storage at the same or another location can be considered.

Especially in the case of assuming disaster recovery (DR), the reduction of availability and file loss are avoided by backing up the VMs, containers, or files at a plurality of locations (e.g., multiple data centers (DC)).

In EC, resources (such as CPUs, memories, storage, network bands, etc.) are distributed broadly and thus, the resources at each location are typically scarce. In addition, due to the trade-off with reliable backup, the usage efficiency of resources is low.

Therefore, when the known backup technique is applied to EC, it is necessary to enhance the communication band between the nodes (office buildings), and the servers and the storage in the nodes, leading to an increase in CAPEX or OPEX. The capital expenditure (CAPEX) refers to facility investment, and operating expenditure (OPEX) refers to operational cost.

That is, when only nodes at geographically separated locations are selected as destinations for backup, the number of destinations for backup is small and the resources at each location is also scarce, resulting in that backup may not achieved. In addition, when backup is executed so as to follow disaster with high update frequency of forecast information, a lot of resources such as network band and storage capacity must be prepared in advance, leading to an increase in CAPEX.

In the present embodiment, the necessity of backup is determined using dynamic forecast information about disasters such as typhoon and lightning, and the required DR level demanded by the user (user failure rate). Thus, in the present embodiment, backup can be achieved according to the DR required level of the user. As a result, in the present embodiment, CAPEX of the infrastructure provider can be reduced to decrease the user's payment cost to the infrastructure provider.

Configuration of Master Server

Figure 16:
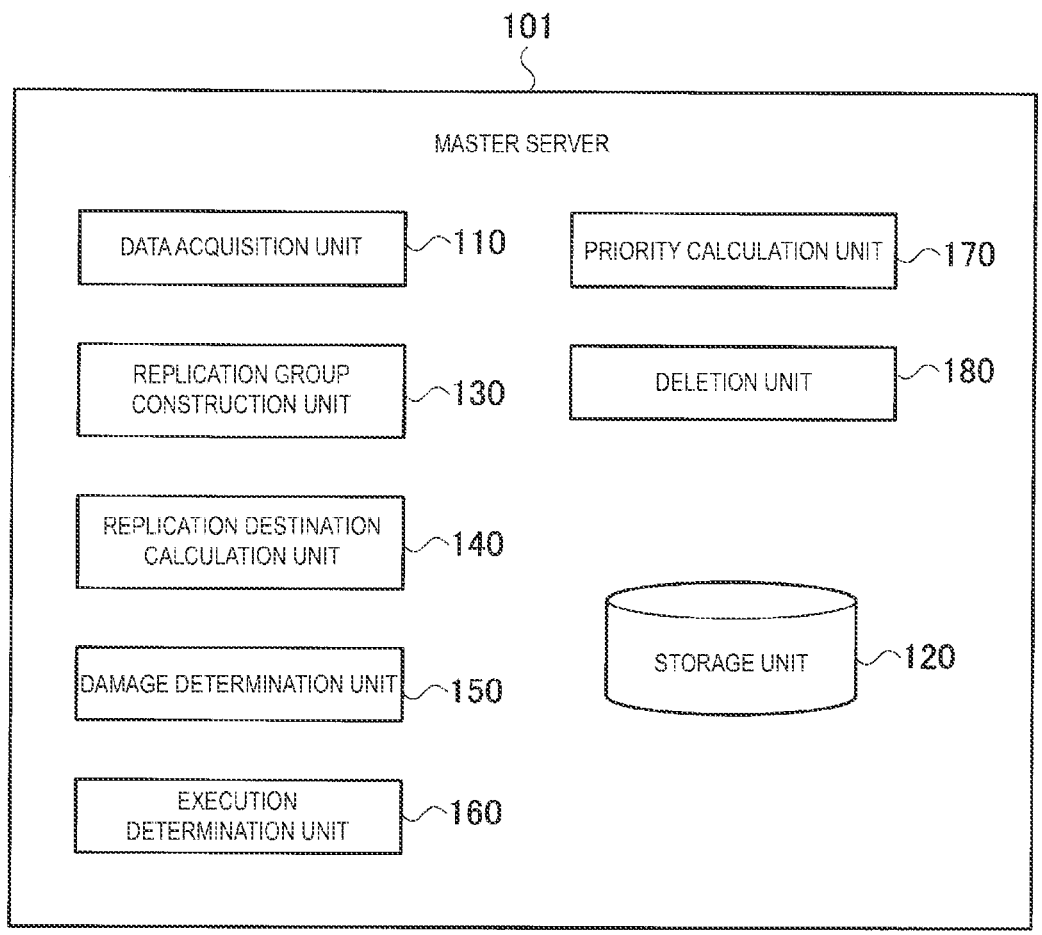
FIG. 16 is a functional block diagram of a master server according to another embodiment.

FIG. 16 is a functional block diagram of the master server according to the present embodiment. The master server 101 in the present embodiment, similar to the embodiment described above, controls replication that performs real-time backup, but may control any type of backup other than replication. The illustrated master server 101 includes a data acquisition unit 110, a replication group construction unit 130, a replication destination calculation unit 140, a damage determination unit 150, an execution determination unit 160, a priority calculation unit 170, a deletion unit 180, and a storage unit 120.

The data acquisition unit 110 acquires various data such as disaster information (disaster forecast information), network information, node information from a predetermined cloud server or by an input of the administrator, and stores the data in the storage unit 120. The disaster information in the present embodiment includes not only the static disaster information described in the embodiments above, but also dynamic disaster forecast information.

The static disaster information is disaster information with low update frequency of information (e.g., once every few years). The dynamic disaster information is disaster information with high update frequency of information (e.g., once every few hours). Examples of the dynamic disaster information include lightning, typhoon, and heavy rain.

The replication group construction unit 130 (backup destination node information generation unit) generates replication group information including following two types of nodes based on the static disaster information. The first type of node is a primary node (first node) including at least one of the data, the VM, or the container. The second type of node is one or more second nodes that are candidates for backup destination of the primary node.

The replication destination calculation unit 140 (backup destination node calculation unit) uses at least one of the network information or the node information to determine the secondary node that is the replication destination from among the second nodes in the replication group information. The replication destination calculation unit 140 also determines an additional node (third node) to respond to the dynamic disaster information and adds the additional node to the replication group information.

The damage determination unit 150 determines whether both the primary node and the secondary node are included in the disaster area of the dynamic disaster information acquired by the data acquisition unit 110. When both the primary node and the secondary node are included in the disaster area, the execution determination unit 160 determines whether the damage rate (EC damage rate) of the primary node and the secondary node is larger than the user failure rate (DR required level of the user) demanded by the user. In other words, the damage determination unit 150 determines the necessity of backup or replication.

The priority calculation unit 170 calculates the resource capacity such as data size available for backup using network band, disaster arrival forecast time, remaining storage capacity of the backup destination, and the like. When the resource capacity required for backup is larger than the resource capacity available for backup, the priority calculation unit 170 sets the priority to data, VMs, and containers.

The deletion unit 180 deletes unnecessary temporary data, temporary VM, and temporary container that have been backed up to the additional node in response to dynamic disaster information.

The storage unit 120 stores various data such as disaster information, network information, and node information that is acquired by the data acquisition unit 110. The storage unit 120 stores the replication group information.

Configuration of Replication Execution Device

Figure 17:
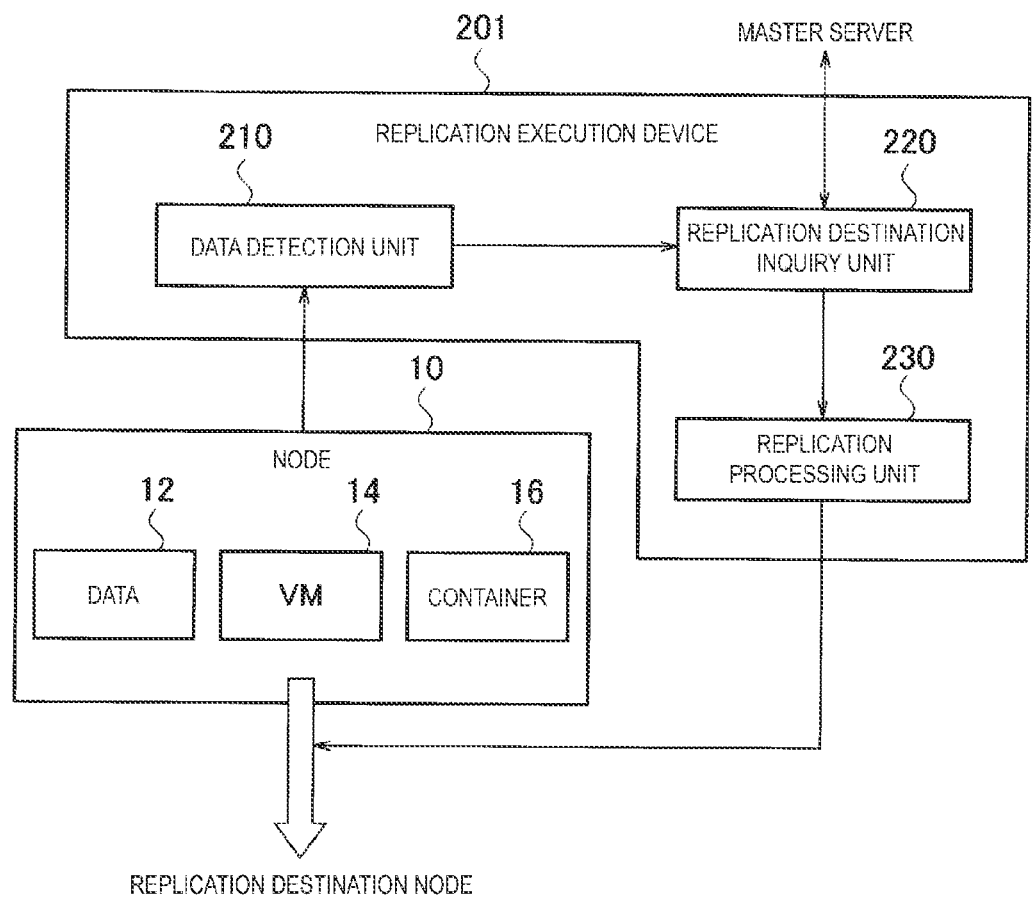
FIG. 17 is a functional block diagram of a replication execution device according to another embodiment.

FIG. 17 is a functional block diagram of a replication execution device according to the present embodiment. The illustrated replication execution device 201 (backup execution unit) includes a data detection 210, a replication destination inquiry unit 220, and a replication processing unit 230.

The data detection 210 in the present embodiment monitors the storage of the node 10 and the like to detect that at least one of the data 12, the VM 14, or the container 16 is updated by the terminal 1.

When the data detection unit 210 detects update, the replication destination inquiry unit 220 inquires the replication destination calculation unit 140 of the master server 101 about the node that is the replication destination. The replication destination inquiry unit 220 specifies the node that is the replication destination, which is notified from the replication destination calculation unit 140, and instructs the replication processing unit 230 to execute replication.

The replication processing unit 230 replicates at least one of the data 12, the VM 14, or the container 16 to the specified node of the replication destination. Also, for the dynamic disaster information, when the EC damage rate is the user failure rate or more, the replication processing unit 230 replicates at least one of the data, the VM, or the container that are stored in the primary node or the node that is the backup destination to the additional node.

Processing of Present Embodiment

Hereinafter, processing executed when the dynamic disaster information is acquired in the state where replication based on the static disaster information has been executed as described in the above embodiment will be described.

Figure 18:
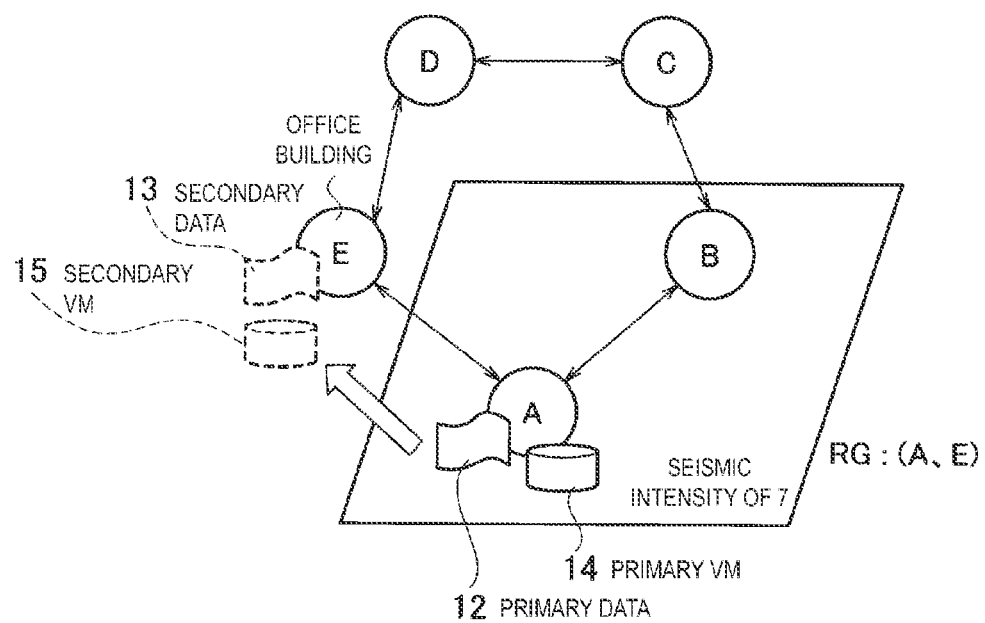
FIG. 18 is a diagram illustrating the replication completed state by static disaster information.

FIG. 18 is a diagram illustrating an example of the state where replication based on the static disaster information has been executed. Here, an earthquake having a seismic intensity of 7 is forecasted as the static disaster information, and the node A and the node B are included in the disaster area. Also, the replication group (RG) of the node A is (A, E), and the replication destination of the node A is the node E. The number of nodes in the replication group is 2. In this case, the primary data 12 and the primary VM 14 at the node A are replicated to the node E and stored in the node E as secondary data 13 (replication data) and a secondary VM 15 (replication VM). The secondary data in the present embodiment is the same as the replication data of the above-described embodiment.

In the illustrated example, the target for replication is the data and the VM, but is not limited thereto. The target for replication may be a container. That is, the target for replication may be at least one of the data, the VM, or the container.

Figure 19:
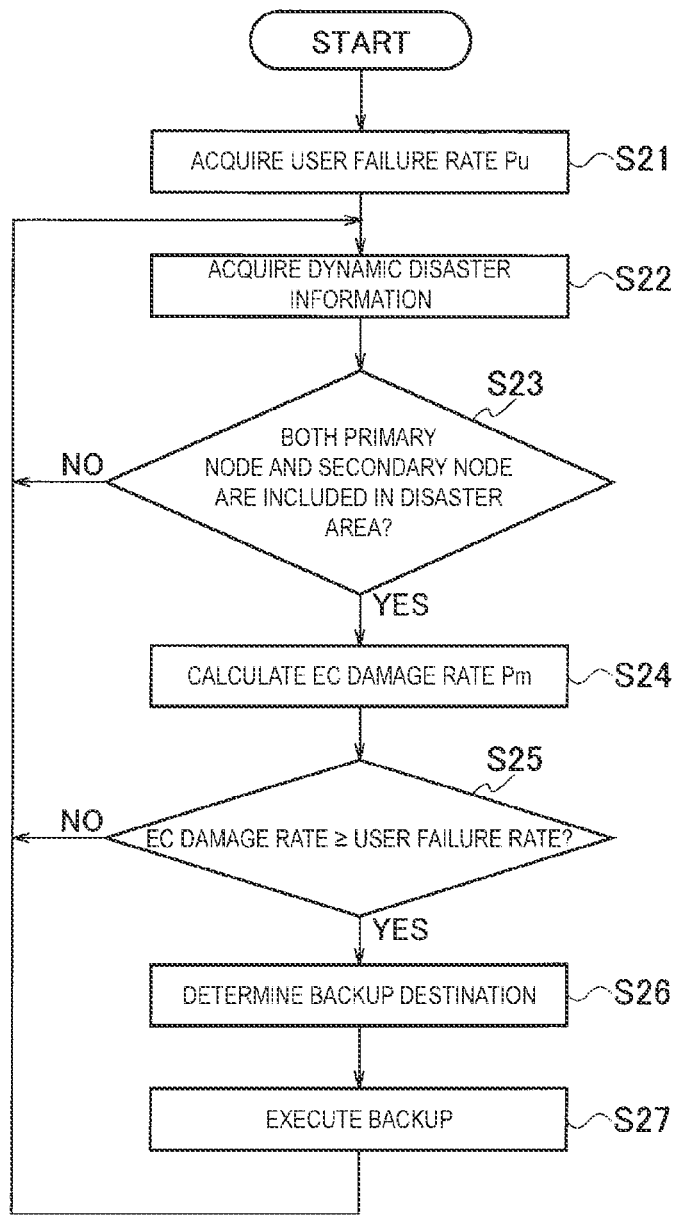
FIG. 19 is a flowchart illustrating processing for dynamic disaster information.

FIG. 19 is a flowchart illustrating processing according to the present embodiment. Hereinafter, processing executed when the dynamic disaster information is acquired in the state where replication based on the static disaster information has been executed as illustrated in FIG. 18 will be described.

The data acquisition unit 110 previously acquires the user failure rate, service level agreement (SLA), cost, and the like that are input using the user terminal by the user (S21). The user failure rate is the failure rate demanded for the EC (e.g., FIG. 1) by the user. The user sets a desired user failure rate Pu (e.g., Pu=f(cost)) by weighing the payment cost to the infrastructure provider.

The user may input, to the master server 101, the SLA, the cost, and the like, instead of the user failure rate. In this case, the data acquisition unit 110 may acquire the SLA or the cost input by the user, and calculate the user failure rate Pu using the SLA or cost.

The data acquisition unit 110 acquires dynamic disaster information from a predetermined cloud server or by an input of the administrator (S22). The data acquisition unit 110 acquires, via a network, dynamic disaster information (e.g., lightning, typhoon, and the like) updated by the government, commercial companies, and the like with a high frequency. Examples of the dynamic disaster information include area information (disaster occurrence range), intensity information (disaster magnitude), occurrence probability information (disaster occurrence probability), and arrival time information (disaster arrival forecast time). The dynamic disaster information is updated with a high frequency, and the data acquisition unit acquires the dynamic disaster information at each update.

The damage determination unit 150 uses the area information of the dynamic disaster information to determine whether both the primary node holding the primary data and the primary VM and the secondary node holding the secondary data and the secondary VM are included in the disaster area (S23). In other words, the damage determination unit 150 determines whether the primary data and the primary VM, and the secondary data and the secondary VM are simultaneously damaged. The damage determination unit 150 makes determinations for each disaster type of dynamic disaster information.

An object of the present embodiment is to prevent simultaneous damage of the primary node (primary data, primary VM, and the like) and the secondary nodes (secondary data, secondary VM, and the like). Thus, as a response to the dynamic disaster information, backup is executed only when the primary node and the secondary node are likely to be simultaneously damaged. The backup also includes replication.

Figure 20:
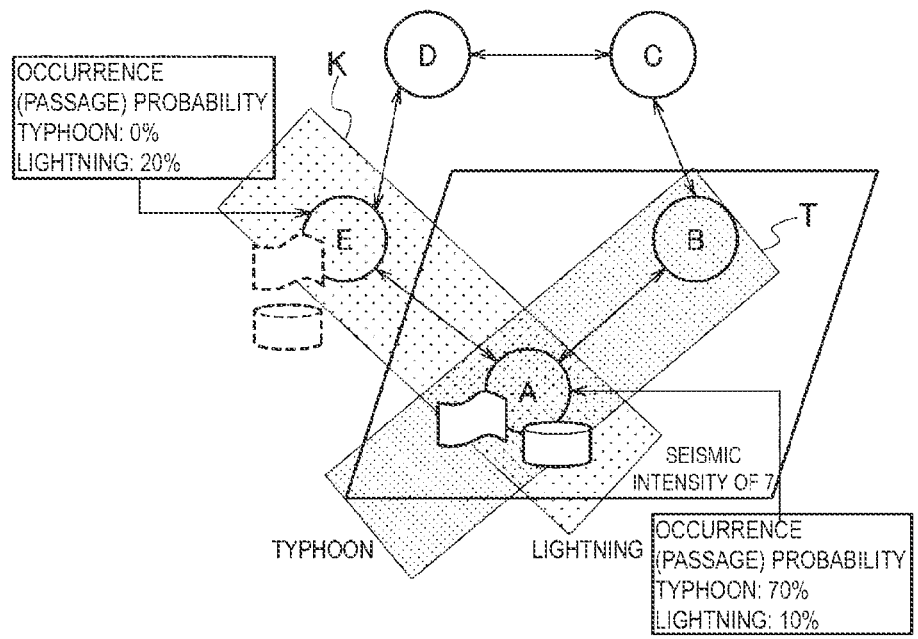
FIG. 20 is a diagram illustrating the dynamic disaster information.

FIG. 20 is an explanatory diagram illustrating the case where the dynamic disaster information is acquired in the replication completed state illustrated in FIG. 18. The illustrated dynamic disaster information includes two pieces of disaster information: typhoon and lightning. The node A and the node B are included in a typhoon disaster area T. and the node A and the node E are included in a lightning disaster area K. The disaster occurrence probability at the node A (primary node) is 70% for typhoon and 10% for lightning. The disaster occurrence probability at the node E (secondary node) is 0% for typhoon and 20% for lightning. Because the node A and the node E are included in the lightning disaster area K, there is a risk of simultaneous damage by lightning. On the other hand, the node A is included and the node E is not included in the typhoon disaster area T, there is no risk of simultaneous damage by typhoon.

Figure 21:
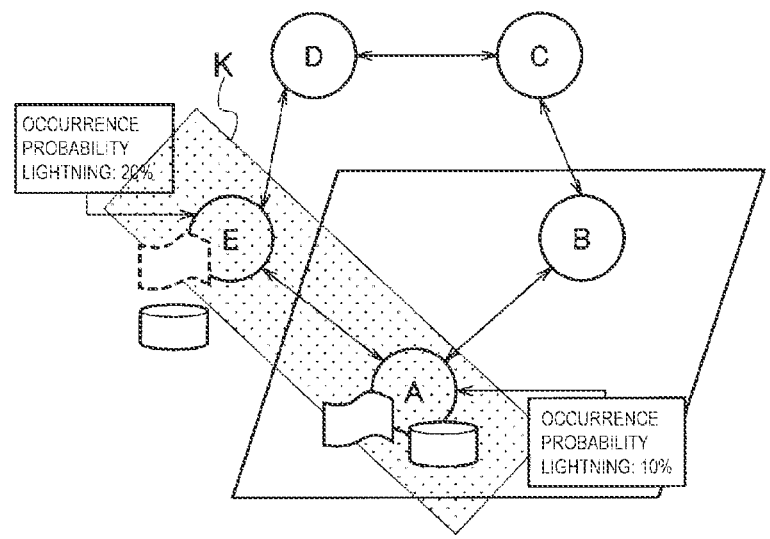
FIG. 21 is a diagram illustrating disaster determination for the dynamic disaster information.

Accordingly, as illustrated in FIG. 21, the damage determination unit 150 determines that both the primary node and the secondary node are included in the lightning disaster area K (S23: YES), and determines to execute backup. On the other hand, the damage determination unit 150 determines that both the primary node and the secondary node are not included in the disaster area T (S23: NO), returns to S22 without determining to execute backup and then, waits for dynamic disaster information to be updated.

When both the primary node and the secondary node are included (S23: YES), the execution determination unit 160 uses disaster occurrence probability, disaster strength, EC failure rate, failure resistance, age of the office building, geographic information, and the like to calculate the EC damage rate Pm (S24). The EC damage rate Pm is an index indicating the probability of damage (failure) of the primary node and secondary nodes in consideration of the occurrence probability of possible disaster. In the present embodiment, the EC damage rate Pm is calculated using a following equation.

$$\text{EC damage rate } Pm = \alpha \times Pi \times Pj$$

α denotes the failure rate at occurrence of disaster, which is calculated using failure resistance, age of the office building, geographic information, and the like. That is, a is an index indicating the probability of failure (damage) of the EC if disaster occurs. Here, the evaluation is made using the safest evaluation, α=1 (when disaster occurs, the EC always fails). Pi is the disaster occurrence probability at the primary node i. Pj is the disaster occurrence probability at the secondary node j. The dynamic disaster information is used for Pi and Pj.

Figure 22:
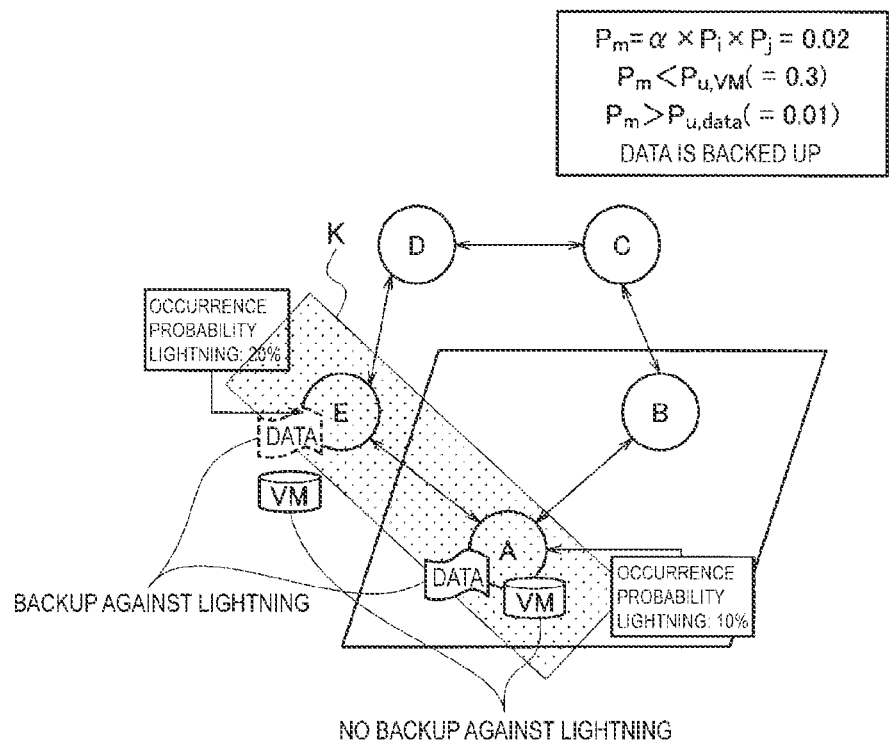
FIG. 22 is a diagram illustrating execution determination for the dynamic disaster information.

In the example in FIG. 22, the probability of occurrence of disaster at node A (primary node) is defined as Pa=0.1, and the probability of occurrence of disaster at the node E (secondary node) is defined as Pe=0.2. In this case, the EC damage rate is as follows.

$$\text{EC damage rate } Pm = 1 \times 0.1 \times 0.2 = 0.02$$

The execution determination unit 160 compares the calculated EC damage rate Pm with the user failure rate Pu acquired in S21 and determines whether to execute backup (S25). Specifically, the execution determination unit 160 determines whether the EC damage rate Pm is the user failure rate Pu or more (EC damage rate Pm≥user failure rate Pu). When the EC damage rate Pm is the user failure rate Pu or more, the failure rate demanded by the user is not satisfied and thus, the execution determination unit 160 determines to execute backup. The execution determination unit 160 makes determination for each type of target (data, VM).

In FIG. 22, the user failure rate Pu, vm of the VM is defined as 0.3, and the user failure rate Pu, data of the data is defined as 0.01. The execution determination unit 160 determines that the EC damage rate Pm is smaller than the user failure rate Pu, vm (Pm<Pu, vm) (S25: NO) and that backup is unnecessary. On the contrary, the execution determination unit 160 determines that the EC damage rate Pm is larger than the user failure rate Pu, data (Pm<Pu, data) (S25: YES), and that the backup is necessary.

The replication destination calculation unit 140 selects an additional node (third node) in response to the dynamic disaster information and adds the additional node to the replication group stored in storage unit 120 (S26). The replication destination calculation unit 140 uses a selection algorithm similar to that of the replication construction processing in the above embodiment to determine the additional node that is the backup destination in response to the dynamic disaster information. The number of additional nodes M is at least one, and is stored in the storage unit 120 in advance.

Here, the replication destination calculation unit 140 uses the number of hops from the primary node or the secondary node to determine the additional node from among nodes that are not included in the disaster area. In this case, the replication destination calculation unit 140 selects the additional node from among the nodes that are not included in the disaster area in the increasing order of the number of hops from the primary node or the secondary node until the number of additional nodes M is reached. When the number of the selected additional nodes exceeds the number of additional nodes M due to the presence of a plurality of nodes having the same number of hops, the replication destination calculation unit 140 selects the additional node based on, for example, the remaining storage capacity.

Figure 23:
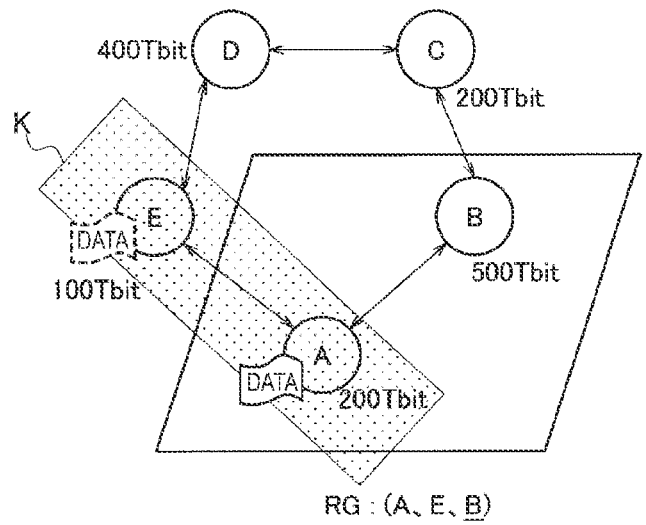
FIG. 23 is a diagram illustrating selection of additional nodes for the dynamic disaster information.

In the example illustrated in FIG. 23, the number of additional nodes M is set to 1. In this case, the nodes that are not included in the lightning disaster area K and have the number of hops of 1 from the node A or the node E are the node B and the node D. The remaining storage capacity of the node B is 500 Tbit and the remaining storage capacity of node D is 400 Tbit. In this case, the replication destination calculation unit 140 selects the node B having the larger remaining storage capacity as the additional node, and adds the additional node B to the replication group. Thus, the replication group for data at the node A in response to the dynamic disaster information of lightning is updated from the original (A, E) to (A, E. [B]).

The replication execution device 201 executes backup in response to the dynamic disaster information according to the updated replication group (S27). Specifically, the replication execution device 201 backs up the target (data, VM) to be backed up from the primary node or secondary node near the additional node (the small number of hops) to the additional node.

When executing backup, the priority calculation unit 170 calculates the resource capacity available for backup (e.g. data size) using network band, disaster arrival forecast time, remaining storage capacity of the backup destination, and the like. When the resource capacity required for backup is larger than the resource capacity available for backup, the priority calculation unit 170 sets the priority to data and VMs. For example, the priority calculation unit 170 sets the priority to each data (file) using data type, data access time, data update time, and the like. In addition, the priority calculation unit 170 may set the priority to each file such that the number of files to be backed up becomes maximum. The replication execution device 201 backs up the data in sequence according to the priority of the data.

Even when the targets for backup are VMs or containers, the priority calculation unit 170 sets, as for the data, the priority to the VMs or containers using type, access time, update time, and the like.

Note that when the number of additional nodes M is multiple, the replication destination calculation unit 140 uses a similar calculation algorithm to that in the above embodiment to determine any one additional node. For example, the replication destination calculation unit 140 selects (a) an additional node having available network band and available storage capacity, (b) an additional node having no available network band but available storage capacity, or (c) an additional node having no storage capacity but available network band. The replication execution device 201 copies the data or VM to the additional node determined by the replication destination calculation unit 140.

Figure 24:
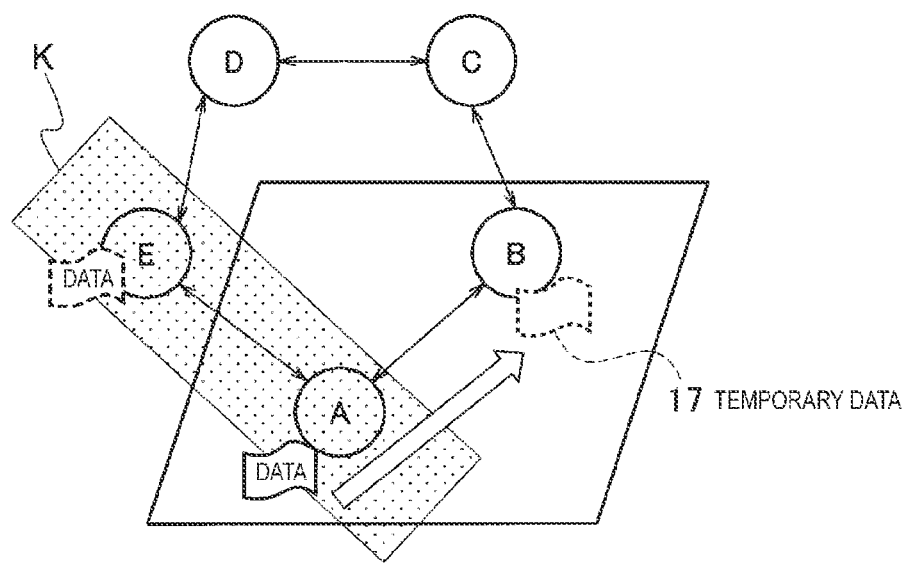
FIG. 24 is a diagram illustrating backup to an additional node.

In the example illustrated in FIG. 24, the replication execution device 201 of the node A (primary node) near the node B (additional node) backs up the primary data at the node A to the node B as the temporary data 17. Here, it is assumed that the data size available for backup calculated by the priority calculation unit 170 is larger than the data size required for backup. In this case, because all of the primary data can be backed up to the node B before lightning arrives, the replication execution device 201 executes simple backup.

Figure 25:
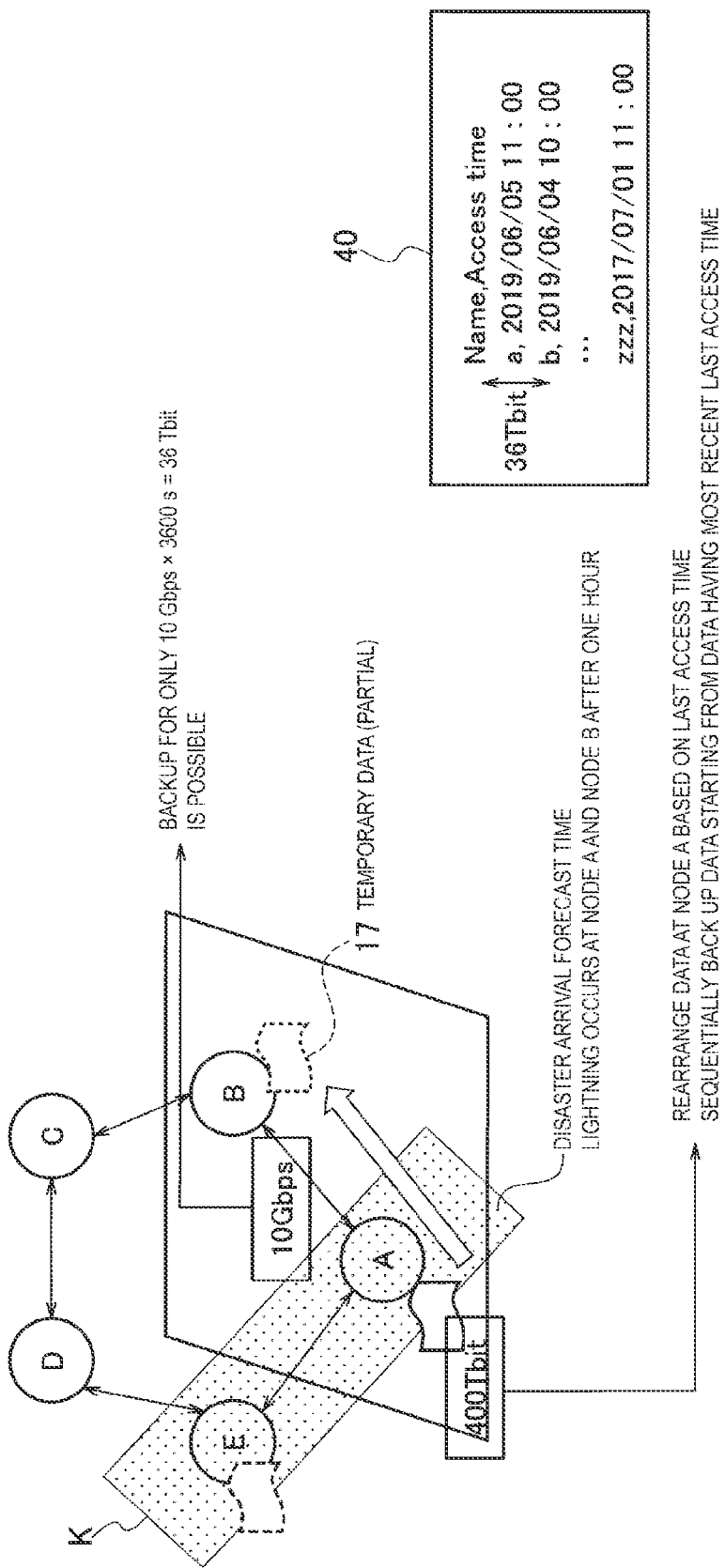
FIG. 25 is a diagram illustrating backup to the additional node using priority.

In the example illustrated in FIG. 25, the data size required for backup is larger than the data size available for backup. In this case, the priority calculation unit 170 sets the priority to the data. In the illustrated example, the priority calculation unit 170 sets the priority of the data using the last access time.

Here, it is assumed that the disaster arrival forecast time included in the disaster information is after one hour, and the network bandwidth between the node A and the node B is 10 Gbps. The priority calculation unit 170 calculates 10 Gbps× 3600 s=36 Tbit as the data size available for backup. The replication execution device 201 rearranges (sorts) the data at the node A using the last access time, and sequentially backs up the data starting from the data having the most recent last access time. In the illustrated example, the replication execution device 201 backs up data 40 at the node A in the order of data a and data b. Since the total amount of data a and b is 36 Tbit, the data a and b are reliably backed up, but the other data may not be backed up.

Figure 26:
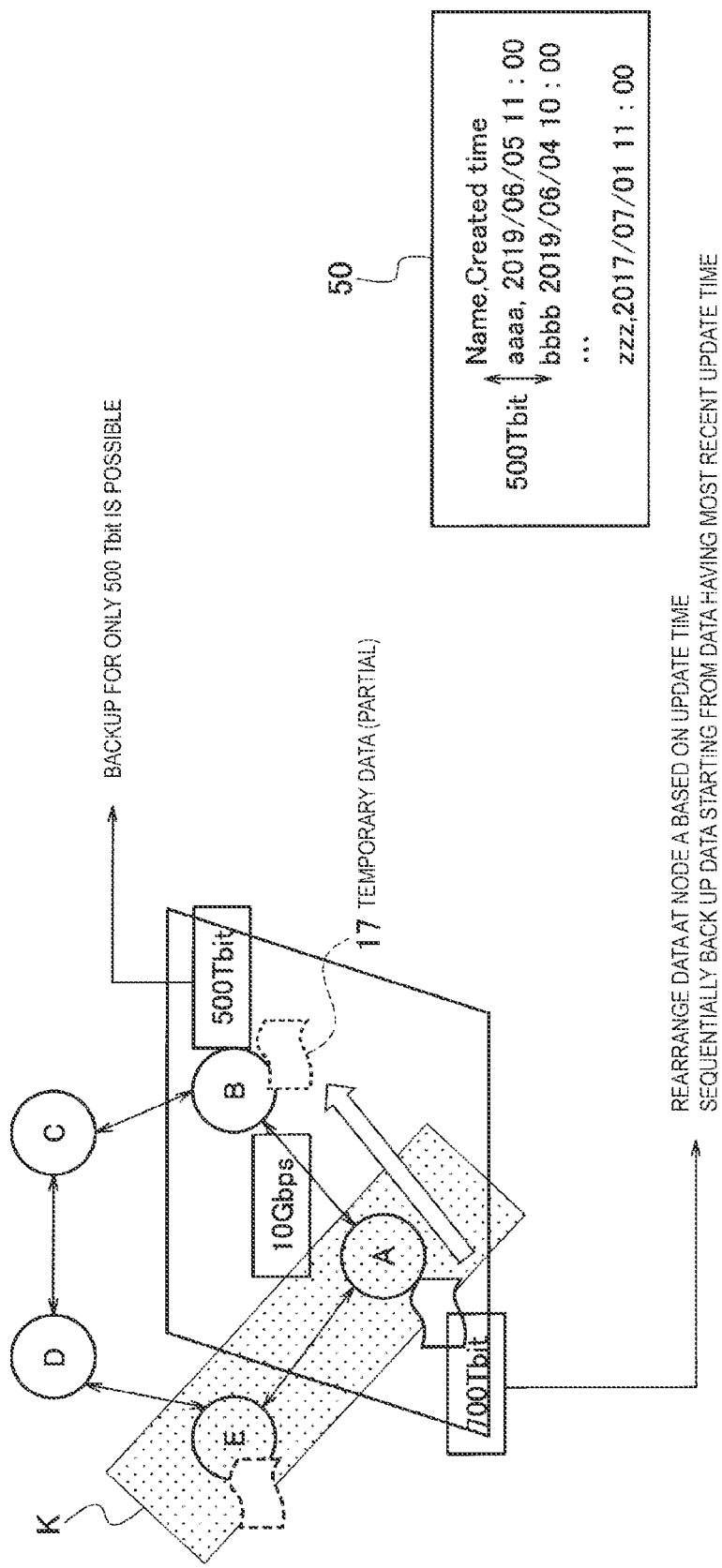
FIG. 26 is a diagram illustrating backup to the additional node using priority.

In the example illustrated in FIG. 26, the data size required for backup is larger than the data size available for backup. In the illustrated example, the priority calculation unit 170 sets the priority of the data using last update time.

Here, the priority calculation unit 170 calculates the data size available for backup using the remaining storage capacity of the node B that is the backup destination. In other words, the priority calculation unit 170 defines the remaining storage capacity of 500 Tbit as the data size available for backup. The replication execution device 201 rearranges the data at the node A using the last update time, and sequentially backs up the data starting from the data having the most recent last update time. In the illustrated example, the replication execution device 201 backs up data 50 at the node A in the order of data aaaa, bbbb. Because the total amount of the data aaaa, bbbb is 500 Tbit, the data aaaa and the data bbbb are reliably backed up, but the other data are not backed up.

Figure 27:
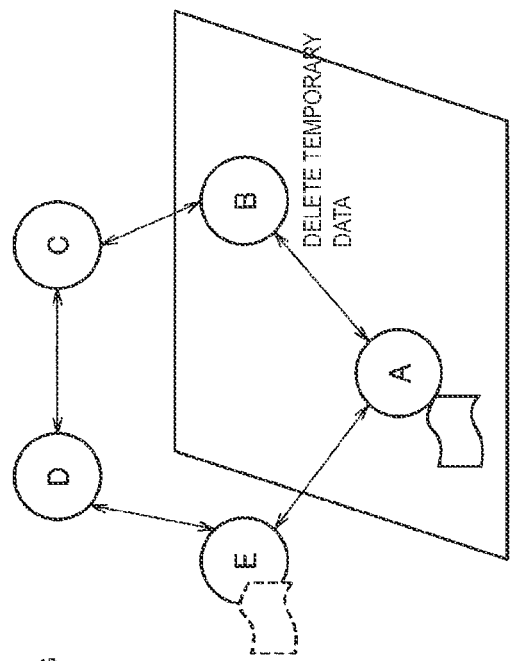
FIG. 27 is a diagram illustrating the deletion of the temporary data from the additional node.
Figure 27:
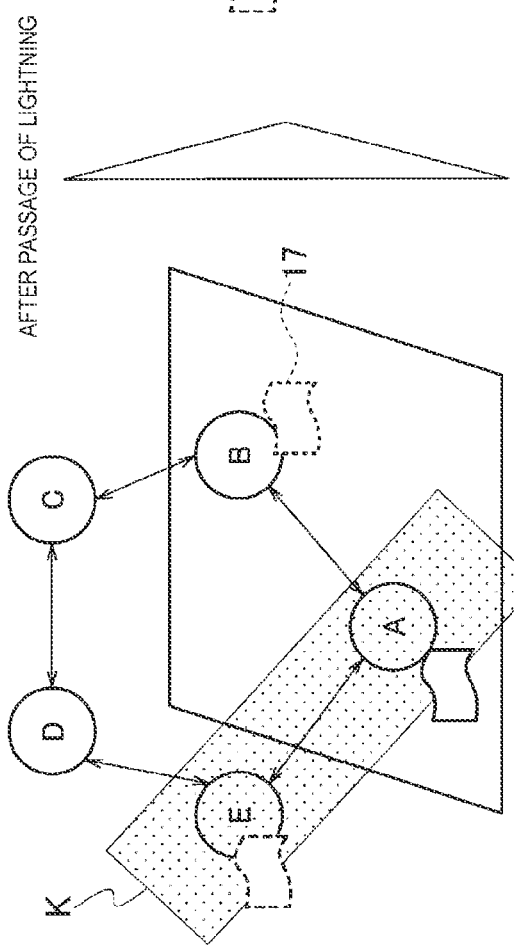

FIG. 27 is a diagram illustrating processing of the deletion unit 180. When lightning passes the node A and node E without damaging the nodes or when no lightning occurs, the temporary data 17 backed up to the node B is unnecessary. The deletion unit 180 deletes the unnecessary temporary data 17. This improves the usage efficiency of resources.

In the present embodiment described above, the necessity of backup in response to the dynamic disaster information is determined using the user failure rate. As a result, in the present embodiment, backup can be achieved according to the disaster countermeasure level demanded by the user. For this reason, in the present embodiment. CAPEX of the infrastructure provider can be reduced to decrease the user's payment cost to the infrastructure provider.

REFERENCE SIGNS LIST

1 Terminal
10 Node
11 Storage
12 Primary data
20 Link
100, 101 Master Server
110 Data acquisition unit
120 Storage unit
130 Replication group construction unit
140 Replication destination calculation unit
150 Damage determination unit
160 Execution determination unit
170 Priority calculation unit
180 Deletion unit
200, 201 Replication execution device
210 Data detection unit
220 Replication destination inquiry unit
230 Replication processing unit

The invention claimed is:

1. A backup system, in a network including a plurality of nodes, each of the plurality of nodes to which storage is deployed, for replicating and storing original data stored in storage of a first node of the plurality of nodes into storage of at least one second node of the plurality of nodes, the backup system comprising:
   an information acquisition unit, including one or more processors, configured to acquire disaster information about a disaster area, network information, node information, and a user-specified damage rate, wherein the information acquisition unit is configured to periodically obtain dynamic disaster information on updates of occurrences of natural disasters;
   a backup destination node information generation unit, including one or more processors, configured to, based on the disaster information about the disaster area, the network information, and the node information, generate backup destination node information including association information between the first node that stores the original data and one or more second nodes of the at least one second node that are candidates for backup destination of the original data, and save the backup destination node information in a predetermined storage unit;
   a backup destination node calculation unit, including one or more processors, configured to, when executing backup of the original data, calculate a second node of the at least one second node as the backup destination from the one or more second nodes that are the candidates for the backup destination included in the backup destination node information; and
   a backup execution unit, including one or more processors, configured to replicate and store the original data from the storage of the first node into the storage of the second node that is calculated; wherein the backup system is further configured to perform:
   determining, based on dynamically acquired disaster information with high update frequency, whether both the first node and the second node calculated as the backup destination are included in a disaster area;
   in response to determining that both the first node and the second node as the backup destination are included in the disaster area, calculating an estimated damage rate that indicates a probability of damage of the first node and the second node due to the occurrences of the natural disasters;
   comparing the estimated damage rate with the user-specified damage rate; and
   in response to determining that the estimated damage rate is equal to or greater than the user-specified damage rate, replicating and storing the original data stored in the first node or backup data stored in the second node calculated as the backup destination to a third node.

2. The backup system according to claim 1, wherein the backup destination node information generation unit is configured to exclude, from all of the plurality of nodes, other nodes of the plurality of nodes included in the disaster information that includes a disaster occurrence location including the first node, and select the one or more second nodes that are the candidates for the backup destination from among the other nodes that are excluded.

3. The backup system according to claim 1, wherein the backup destination node calculation unit is configured to calculate, based on an index value, as an entire system, of storage usage efficiency or cost, or an index value of throughput at backup, a node of the plurality of nodes from among a plurality of second nodes that are the candidates for the backup destination included in the backup destination node information so as to optimize the index value.

4. The backup system according to claim 1, further comprising
a data detection unit, including one or more processors, configured to detect saving of the original data in the storage of the first node, wherein
when the data detection unit is configured to detect the saving of the original data, the backup execution unit is configured to inquire the backup destination node calculation unit about the second node that is the backup destination, and replicate and store the original data into the storage of the second node related to a response to the inquiry.

5. A backup method in a backup system, in a network including a plurality of nodes, each of the plurality of nodes to which storage is deployed, for replicating and storing original data stored in storage of a first node of the plurality of nodes into storage of at least one second node of the plurality of nodes, the backup method comprising:
by an information acquisition unit including one or more processors, acquiring disaster information about a disaster area, network information, node information, and a user-specified damage rate, wherein the information acquisition unit is configured to periodically obtain dynamic disaster information on updates of occurrences of natural disasters;
by a backup destination node information generation unit including one or more processors, based on the disaster information about the disaster area, the network information, and node information, generating backup destination node information including association information between the first node that stores the original data and one or more second nodes of the at least one second node that are candidates for backup destination of the original data, and saving the backup destination node information in a predetermined storage unit;
by a backup destination node calculation unit including one or more processors, when executing backup of the original data, calculating a second node of the at least one second node as the backup destination from the one or more second nodes that are the candidates for the backup destination included in the backup destination node information;
by a backup execution unit including one or more processors, replicating and storing the original data from the storage of the first node into the storage of the second node that is calculated:
determining, based on dynamically acquired disaster information with high update frequency, whether both the first node and the second node calculated as the backup destination are included in the disaster area;
in response to determining that both the first node and the second node as the backup destination are included in the disaster area, calculating an estimated damage rate that indicates a probability of damage of the first node and the second node due to the occurrences of the natural disasters;
comparing the estimated damage rate with the user-specified damage rate; and
in response to determining that the estimated damage rate is equal to or greater than the user-specified damage rate, replicating and storing the original data stored in the first node or backup data stored in the second node calculated as the backup destination to a third node.

6. A backup system comprising:
an information acquisition unit, including one or more processors, configured to acquire disaster information about a disaster area and a user-specified damage rate, wherein the information acquisition unit is configured to periodically obtain dynamic disaster information on updates of occurrences of natural disasters;
a backup destination node information generation unit, including one or more processors, configured to, based on the disaster information about the disaster area, generate group information including a first node having at least one of data, a VM, or a container, and one or more second nodes that are candidates for backup destination of the first node;
a backup destination node calculation unit, including one or more processors, configured to use at least one of network information or node information to determine a backup destination node from among the one or more second nodes in the group information; and
a backup execution unit, including one or more processors, configured to replicate at least one of the data, the VM, or the container to the backup destination node; wherein the backup system is further configured to perform:
determining, based on dynamically acquired disaster information with high update frequency, whether both the first node and the second node calculated as the backup destination are included in the disaster area;
in response to determining that both the first node and the second node as the backup destination are included in the disaster area, calculating an estimated damage rate that indicates a probability of damage of the first node and the second node due to the occurrences of the natural disasters;
comparing the estimated damage rate with the user-specified damage rate; and
in response to determining that the estimated damage rate is equal to or greater than the user-specified damage rate, replicating and storing the original data stored in the first node or backup data stored in the second node calculated as the backup destination to a third node.

7. A non-transitory computer readable medium storing a program that causes a computer to operate as each of units of a backup system, in a network including a plurality of nodes, each of the plurality of nodes to which storage is deployed, for replicating and storing original data stored in storage of a first node of the plurality of nodes into storage of at least one second node of the plurality of nodes, the backup system comprising:
an information acquisition unit, including one or more processors, configured to acquire disaster information about a disaster area, network information, node information, and a user-specified damage rate, wherein the information acquisition unit is configured to periodically obtain dynamic disaster information on updates of occurrences of natural disasters;

a backup destination node information generation unit, including one or more processors, configured to, based on the disaster information about the disaster area, the network information, and the node information, generate backup destination node information including association information between the first node that stores the original data and one or more second nodes of the at least one second node that are candidates for backup destination of the original data, and save the backup destination node information in a predetermined storage unit;

a backup destination node calculation unit, including one or more processors, configured to, when executing backup of the original data, calculate a second node of the at least one second node as the backup destination from the one or more second nodes that are the candidates for the backup destination included in the backup destination node information; and a backup execution unit, including one or more processors, configured to replicate and store the original data from the storage of the first node into the storage of the second node that is calculated; wherein the backup system is further configured to perform:

determining, based on dynamically acquired disaster information with high update frequency, whether both the first node and the second node calculated as the backup destination are included in the disaster area;

in response to determining that both the first node and the second node as the backup destination are included in the disaster area, calculating an estimated damage rate that indicates a probability of damage of the first node and the second node due to the occurrences of the natural disasters;

comparing the estimated damage rate with the user-specified damage rate; and in response to determining that the estimated damage rate is equal to or greater than the user-specified damage rate, replicating and storing the original data stored in the first node or backup date stored in the second node calculated as the backup destination to a third node.

8. The non-transitory computer readable medium according to claim 7, wherein the backup system further comprises:

a data detection unit, including one or more processors, configured to detect saving of the original data in the storage of the first node, wherein when the data detection unit is configured to detect the saving of the original data, the backup execution unit is configured to inquire the backup destination node calculation unit about the second node that is the backup destination, and replicates replicate and stores store the original data into the storage of the second node related to a response to the inquiry.

9. The backup method according to claim 5, further comprising:

by the backup destination node information generation unit excluding, from all of the plurality of nodes, other nodes of the plurality of nodes included in the disaster information that includes a disaster occurrence location including the first node, and selecting the one or more second nodes that are the candidates for the backup destination from among the other nodes that are excluded.

10. The backup method according to claim 5, further comprising:

by the backup destination node calculation unit, calculating, based on an index value, as an entire system, of storage usage efficiency or cost, or an index value of throughput at backup, a node of the plurality of nodes from among a plurality of second nodes that are the candidates for the backup destination included in the backup destination node information so as to optimize the index value.

11. The backup method according to claim 5, further comprising:

by a data detection unit, including one or more processors, detecting saving of the original data in the storage of the first node; and by the backup execution unit, in response to the data detection unit detecting the saving of the original data, inquiring the backup destination node calculation unit about the second node that is the backup destination, and replicating and storing the original data into the storage of the second node related to a response to the inquiry.

12. The backup system according to claim 1, wherein the estimated damage rate is calculated using a disaster occurrence probability, a disaster strength, and one or more of: a failure resistance, an age of an infrastructure, or geographic information.

* * * * *